United States Patent
Sasaki et al.

(10) Patent No.: US 6,374,479 B1
(45) Date of Patent: Apr. 23, 2002

(54) METHOD AND APPARATUS FOR MANUFACTURING SLIDER

(75) Inventors: Yoshitaka Sasaki; Tatsuya Harada; Kunimasa Nakata, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/391,199

(22) Filed: Sep. 7, 1999

(51) Int. Cl.$^7$ ................................................. G11B 5/127
(52) U.S. Cl. ................................. 29/603.16; 29/603.12; 29/412; 29/414; 29/417; 29/423; 29/424
(58) Field of Search ........................... 29/557, 558, 412, 29/414, 417, 603.01, 603.12, 603.16, 423, 424

(56) References Cited

U.S. PATENT DOCUMENTS

| | | | |
|---|---|---|---|
| 4,226,018 A | * 10/1980 | Nakanishi et al. | ............. 29/603 |
| 4,310,957 A | * 1/1982 | Sachs | |
| 4,893,203 A | * 1/1990 | Ezaki et al. | |
| 5,095,613 A | * 3/1992 | Hussinger et al. | ............. 29/603 |
| 5,271,802 A | * 12/1993 | Chang et al. | .................. 29/603 |
| 5,321,882 A | * 6/1994 | Zarouri et al. | ................. 29/423 |
| 5,406,694 A | * 4/1995 | Ruiz | ............................ 29/603 |
| 5,603,156 A | * 2/1997 | Biskeborn et al. | ........ 29/603.16 |
| 5,634,259 A | * 6/1997 | Sone et al. | ............... 29/603.12 |
| 5,722,156 A | * 3/1998 | Ballfrey et al. | ........... 29/603.12 |
| 5,832,585 A | * 11/1998 | Takiar et al. | .................. 29/424 |
| 6,072,663 A | * 6/2000 | Yokohata et al. | |
| 6,264,535 B1 | * 7/2001 | Chang et al. | .................. 29/417 |

FOREIGN PATENT DOCUMENTS

| | | |
|---|---|---|
| JP | A-4-289511 | 10/1992 |
| JP | 06-67310 | * 3/1994 |
| JP | 07-14137 | * 1/1995 |

* cited by examiner

Primary Examiner—David P. Bryant
Assistant Examiner—Eric Compton
(74) Attorney, Agent, or Firm—Oliff & Berridge, PLC

(57) ABSTRACT

An object of the invention is to manufacture sliders having excellent properties with accuracy and to improve the production efficiency and the cleaning property.

In a method of the invention to manufacture a bar in which a row of slider sections are aligned, a wafer block is made from a wafer in which rows of slider sections are aligned. The wafer block is bonded to a dummy block on a support plate. Next, a processing step and a cutting step are repeated. The processing step is to perform a specific processing on the medium facing surfaces of a row of slider sections in the medium facing surface of the wafer block bonded to the support plate. The cutting step is to cut the wafer block together with the support plate such that the row of slider sections whose medium facing surfaces have received the specific processing are separated from the wafer block to be the bar. A tape is affixed to the medium facing surfaces to protect the medium facing surfaces in the cutting step.

10 Claims, 18 Drawing Sheets

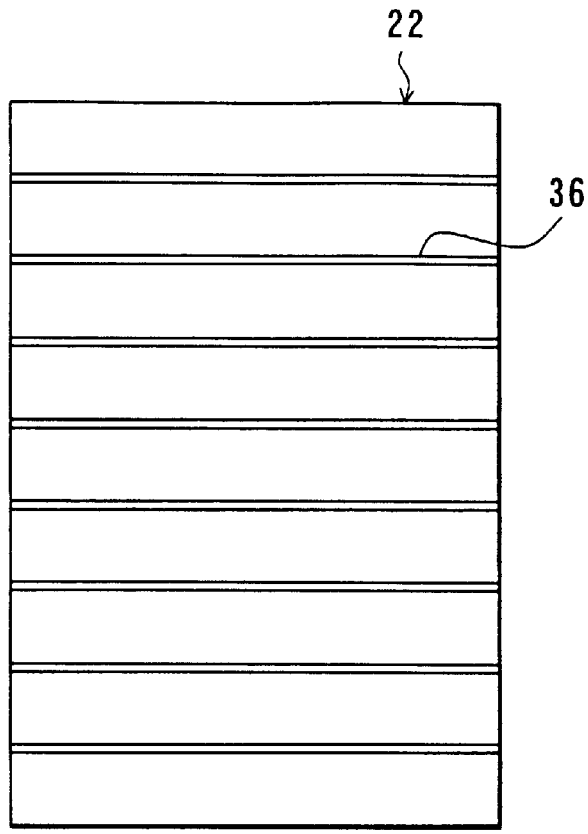
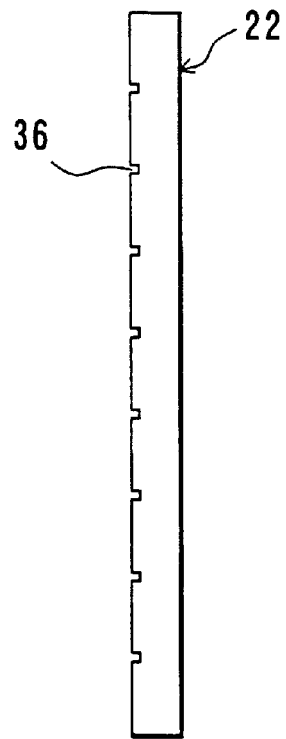
FIG. 8A    FIG. 8B
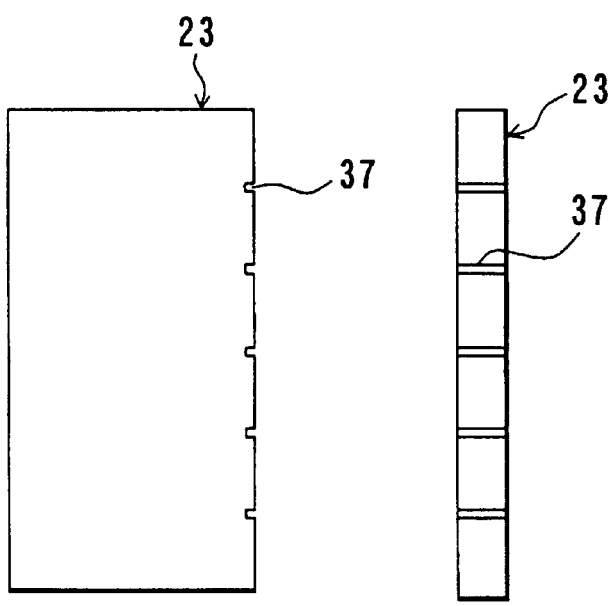
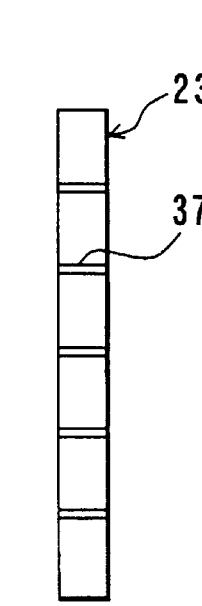
FIG. 9A    FIG. 9B

METHOD AND APPARATUS FOR MANUFACTURING SLIDER

BACKGROUND OF THE INVENTION

1. Field of the Invention

The present invention relates to a method and an apparatus for manufacturing sliders used for a thin-film magnetic head and the like.

2. Description of the Related Art

A flying-type thin-film magnetic head used for a magnetic disk device and so on is generally made up of a thin-film magnetic head slider (that may be simply called a slider) having a thin-film magnetic head element provided at the trailing edge of the slider. The slider generally comprises a rail whose surface functions as a medium facing surface (an air bearing surface) and a tapered section or a step near the end on the air inflow side. The rail flies slightly above the surface of a recording medium such as a magnetic disk by means of air flow from the tapered section or step.

A thin-film magnetic head element generally used is a composite-type element made up of layers of an induction magnetic transducer for writing and a magnetoresistive (MR) element for reading.

In general, such thin-film magnetic head sliders are formed through cutting a wafer in one direction in which sections to be sliders (called slider sections in the following description) each including a thin-film magnetic head element are arranged in a plurality of rows. A block called a bar in which the slider sections are arranged in a row is thereby formed. Rails are then formed in the bar and the bar is cut into the sliders.

The manufacturing process of the sliders includes a step of processing the medium facing surface of the bar, that is, grinding or lapping the medium facing surface and a step of cutting the wafer into the bars. The order of the step of processing the medium facing surface and the step of cutting the wafer into the bars depends on methods of processing the medium facing surface and cutting the wafer, as described later.

In the step of processing the medium facing surface, it is required that the MR height and the throat height of the thin-film magnetic head element formed in the bar each fall within a tolerance range and that processing accuracy of the surface processed falls within a tolerance range. The MR height is the length (height) between the end of the MR element close to the medium facing surface and the opposite end. The throat height is the length (height) of the magnetic pole of an induction magnetic transducer.

In related art the following method is generally taken to process the medium facing surfaces of the bars and cutting the wafer into the bars. That is, a bar including a row of slider sections is cut from a wafer. The bar is fixed to a specific jig by bonding the surface of the bar opposite to the medium facing surface to the jig. The medium facing surface of the bar thus fixed to the jig is then processed. This method is called a first method in the following description.

In related art, second and third methods described below have been proposed, in addition to the first method, for processing the medium facing surfaces of the bars and cutting the wafer into the bars.

The second method is, as shown in FIG. 7 of U.S. Pat. No. 5,406,694, for example, a specific length of block including rows of slider sections is cut from a wafer. The block is fixed to a specific jig by bonding the surface of the block opposite to the medium facing surface to the jig. The medium facing surface of the block thus fixed to the jig is then processed. The block is then cut into bars whose medium facing surfaces have been processed.

The third method is, as shown in FIG. 3 of Japanese Patent Application Laid-open Hei 4-289511, for example, a wafer is fixed to a specific jig and the medium-facing surface of the wafer fixed to the jig is processed. The wafer is then cut into bars whose medium facing surfaces have been processed.

Of the foregoing methods, in the first method a bar including a row of slider sections is cut from a wafer. The bar is fixed to a jig and the medium facing surface of the separated bar is then processed. Consequently, the bar is often affected by the state of the interface between the bar and the jig or by warpage caused by bonding and likely to be deformed and to form a curvature and the like. As a result, it is likely that processing accuracy of the surface of the bar processed is reduced and deformation occurs, such as curvatures of the layers making up the thin-film magnetic head elements formed in the bar. In addition, it is difficult to precisely control the resistance of the MR element, the MR height and the throat height. It is therefore difficult to precisely fabricate thin-film magnetic head sliders with excellent properties.

In contrast, the second and third methods do not include the step of fixing a separate bar sliced from a wafer to the jig. Therefore, the above-stated problems are reduced. In the second and third methods, however, the medium facing surface is processed and then the wafer or block is cut into bars while the medium facing surface is exposed. Consequently, the pole portions may be eroded by a water-soluble grinding agent, dust may deposit on the medium facing surface, and mechanical scratches may result on the medium facing surface when the wafer or block is cut into bars. Furthermore, the bar may be chipped while handled after the bar is sliced from the wafer. It is therefore difficult to precisely fabricate thin-film magnetic head sliders with excellent properties.

Another method for overcoming the foregoing problems is to bond a dedicated jig to the medium facing surface of a wafer or a block with a binder such as a thermosetting resin or a thermoplastic adhesive. In this method, however, it is required that every time the wafer or block is sliced, the medium facing surface of the wafer or block is bonded to the jig before slicing, and the bar is detached from the jig after slicing. These bonding and removing make the manufacturing process complicated and require extra time, and the production efficiency is reduced. The method further has a problem that binder residues (adhesive transfer) are left on the medium facing surface and the cleaning ability (the cleaning efficiency and the state after cleaning) are not satisfactory. In addition, since it is required that the bar is removed from the jig after slicing, automation of the processing performed on the sliced bar is difficult.

The third method requires steps of fixing the wafer to the jig and separating the wafer from the jig every time the bar is sliced. The manufacturing process is therefore complicated and the production efficiency is reduced.

In related-art methods of manufacturing sliders, human handling and so on may cause static damage to the sliders and the thin-film magnetic head elements formed in the sliders, in particular.

SUMMARY OF THE INVENTION

It is an object of the invention to provide a method and an apparatus for manufacturing sliders having excellent properties with accuracy and for improving the production efficiency and the cleaning property.

A method of manufacturing sliders of the invention is provided for fabricating a slider aggregate that is made from a material including a plurality of rows of sections to be the sliders each having a medium facing surface. The slider aggregate includes one of the rows of the sections to be the sliders whose medium facing surfaces receive a specific processing. The method includes the steps of: performing the specific processing on the medium facing surfaces of the row of the sections to be the sliders located at one end of the material; and cutting the material while the medium facing surfaces are covered with a strip-shaped protection member such that the row of the sections to be the sliders whose medium facing surfaces have received the specific processing are separated from the material to be the slider aggregate.

In the method of manufacturing sliders of the invention, the specific processing is performed on the medium facing surfaces of the row of the sections to be the sliders located at one end of the material in the step of performing the processing. The material is cut while the medium facing surfaces are covered with the strip-shaped protection member such that the row of the sections to be the sliders whose medium facing surfaces have received the specific processing are separated from the material to be the slider aggregate in the step of cutting. The slider aggregate is thus manufactured.

In the method the protection member may be a tape having adhesiveness and the step of cutting may include the step of bonding the protection member to the medium facing surfaces located in the material before cutting the material. In this case, the method of manufacturing sliders may further include the step of peeling off the protection member from the slider aggregate having gone through the step of cutting. In the step of peeling off the protection member, the protection member may be peeled off from the slider aggregate after the adhesiveness of the protection member is reduced.

In the method the protection member may be a tape containing a conductive substance. In this case, the protection member made up of the tape containing the conductive substance prevents static damage to the sliders.

In the method the protection member may be a tape having no adhesiveness and the step of cutting may include the step of holding the medium facing surfaces located in the material while the protection member is inserted before cutting the material.

In the method the protection member may include a resist layer made of a photoresist material. In this case, the method may further include the step of forming an etching mask using the resist layer of the protection member on the medium facing surface of the slider aggregate having gone through the step of cutting, and etching the medium facing surface through the use of the mask.

In the method the step of performing the processing may include lapping of the medium facing surfaces.

In the method the sections to be the sliders may each include a thin-film magnetic head element.

An apparatus for manufacturing sliders of the invention is provided for fabricating a slider aggregate that is made from a material including a plurality of rows of sections to be the sliders each having a medium facing surface. The slider aggregate includes one of the rows of the sections to be the sliders whose medium facing surfaces receive a specific processing. The apparatus comprises: a means (or a member) for holding the material, the medium facing surfaces of the row of the sections to be the sliders located at one end of the material having received the specific processing, while the medium facing surfaces are covered with a strip-shaped protection member; and a means (or a device) for cutting the material held by the means (member) for holding while the medium facing surfaces are covered with the protection member such that the row of the sections to be the sliders whose medium facing surfaces have received the specific processing are separated from the material to be the slider aggregate.

In the apparatus the material is held by the means (member) for holding, the medium facing surfaces of the row of the sections to be the sliders located at one end of the material having received the specific processing, while the medium facing surfaces are covered with a strip-shaped protection member. The material held by the means (member) for holding is cut with the means (device) for cutting while the medium facing surfaces are covered with the protection member such that the row of the sections to be the sliders whose medium facing surfaces have received the specific processing are separated from the material to be the slider aggregate.

In the apparatus of the invention, the means (member) for holding may include a section for holding the material and a section for holding the protection member.

Other and further objects, features and advantages of the invention will appear more fully from the following description.

BRIEF DESCRIPTION OF THE DRAWINGS

FIG. 8A and FIG. 8B are views for illustrating the surface configuration of the support plate of the embodiment of the invention.

FIG. 9A and FIG. 9B are views for illustrating the surface configuration of the dummy block of the embodiment of the invention.

DETAILED DESCRIPTION OF THE PREFERRED EMBODIMENT

Figure 1:
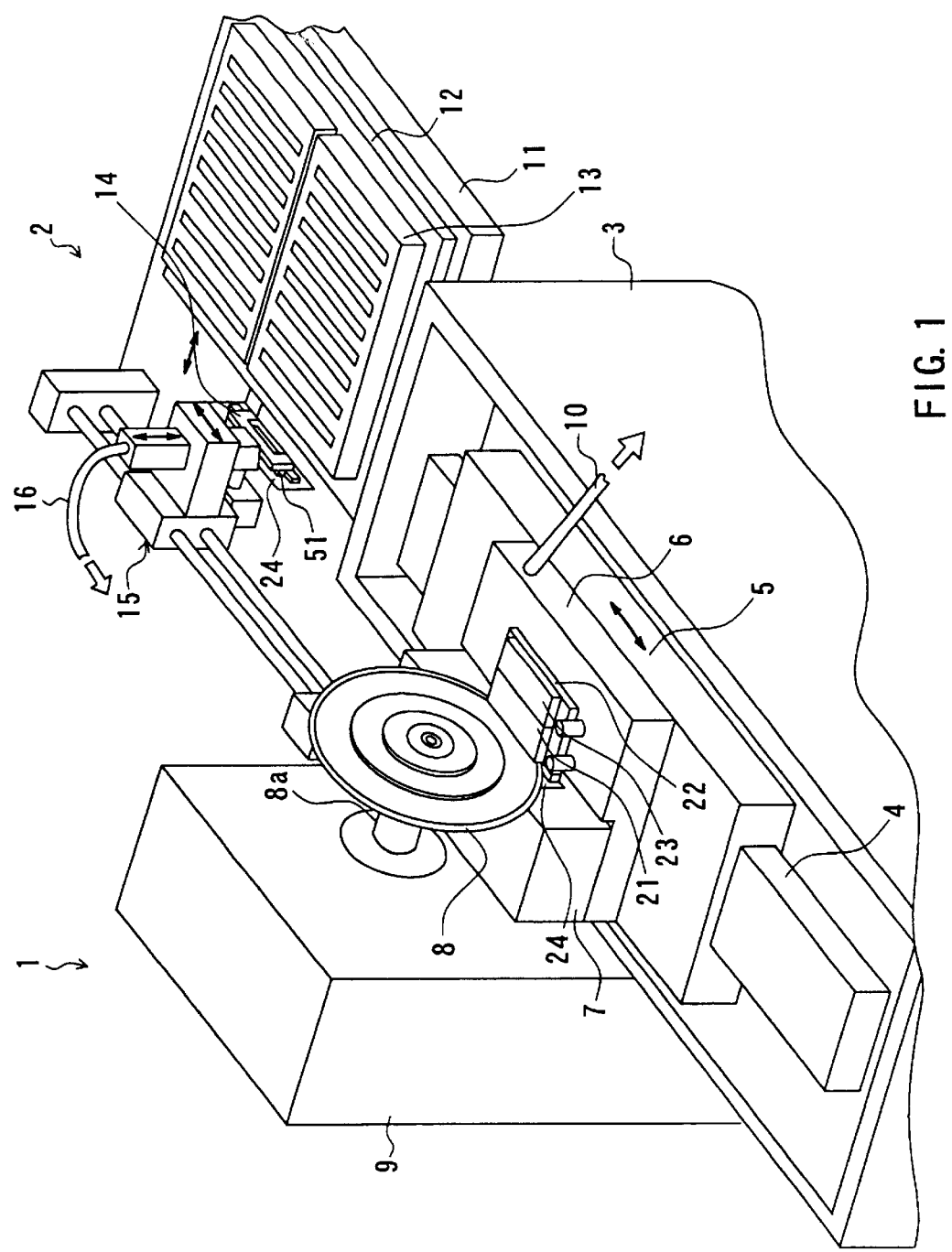
FIG. 1 is a perspective view of an apparatus for manufacturing sliders of an embodiment of the invention.

A preferred embodiment of the invention will now be described in detail with reference to the accompanying drawings. Reference is made to FIG. 1 to briefly describe a method and an apparatus for manufacturing sliders of an embodiment of the invention. FIG. 1 is a perspective view of a slider processing apparatus as the apparatus for manufacturing sliders of the embodiment.

The method of manufacturing sliders of the embodiment is to manufacture a bar 51 out of a wafer block 21. The wafer block 21 is a material made up of a plurality of rows of sections to be sliders (called slider sections in the following description) each including a thin-film magnetic head element and having a medium facing surface. The bar 51 is a slider aggregate, that is, a row of slider sections whose medium facing surfaces have received a specific processing. The slider manufacturing method of the embodiment includes a first step and a second step.

In the first step, the wafer block 21 is first formed out of a wafer in which a plurality of rows of slider sections are aligned. Next, a support plate 22 is joined to the surface of the wafer block 21 opposite to the surface in which thin-film magnetic head elements are formed, of the surfaces of the wafer block 21 including surfaces of all the slider sections. The support plate 22 is a support member for supporting all the slider sections of the wafer block 21. In the first step, a dummy block 23 is placed on a side opposite to the medium facing surfaces located in the wafer block 21. The dummy block 23 is an auxiliary support member for assisting in supporting the wafer block 21. The dummy block 23 is joined to the surface of the wafer block 21 opposite to the medium facing surface and joined to the support plate 22.

The second step includes a processing step and a cutting step. In the processing step specific processing is performed on the medium facing surfaces of a row of slider sections located in the medium facing surface of the wafer block 21 joined to the support plate 22. In the cutting step the wafer block 21 and the support plate 22 are cut together such that the row of slider sections whose medium facing surfaces have received the specific processing is separated from the wafer block 21 to be the bar 51. The processing and cutting steps are repeated.

The slider processing apparatus shown in FIG. 1 is used for performing the cutting step of the above-stated second step. The processing apparatus comprises a cutting mechanism section 1 for performing cutting operations of the wafer block 21 and a storage section 2 for performing storing operations of the bar 51 separated from the wafer block 21.

The cutting mechanism section 1 comprises: an apparatus body 3; a guide rail 4 provided on top of the body 3 and extending in the side-to-side direction; a moving section 5 driven by a drive apparatus not shown and movable along the guide rail 4; a support plate holding section 6, provided on the moving section 5, for absorbing and holding the support plate 22 to which the wafer block 21 is joined; a tape holding section 7, placed on the support plate holding section 6 on one side of the section 6, for absorbing and holding a tape 24 as a protection member affixed to the medium facing surface of the wafer block 21 when the wafer block 21 and the support plate 22 are cut together; a cutting blade 8 as a means (a device) for cutting the wafer block 21 and the support plate 22 together; and a blade supporting section 9 for supporting a rotation axis 8a of the blade 8. In the blade supporting section 9, a motor not shown is provided for rotating the rotation axis 8a of the blade 8. To the support plate holding section 6, an absorbing tube 10 for absorbing the support plate 22 is connected.

The support plate holding section 6 and the tape holding section 7 correspond to a means (a member) for holding of the invention. The support plate holding section 6 corresponds to a section for holding the material of the invention. The tape holding section 7 corresponds to a section for holding the protection member of the invention.

The storage section 2 comprises: a base 11; a tray platform 12, placed on the base 11, on which a tray 13 is placed, driven by a drive apparatus not shown and movable in the back-and-forth direction; vacuum tweezers 14 for storing the bar 51 separated from the wafer block 21 in the tray 13; and a drive apparatus 15, provided on the base 11, for moving the tweezers 14 in up-and-down and side-to-side directions. An absorbing tube 16 is connected to the tweezers 14.

Figure 2:
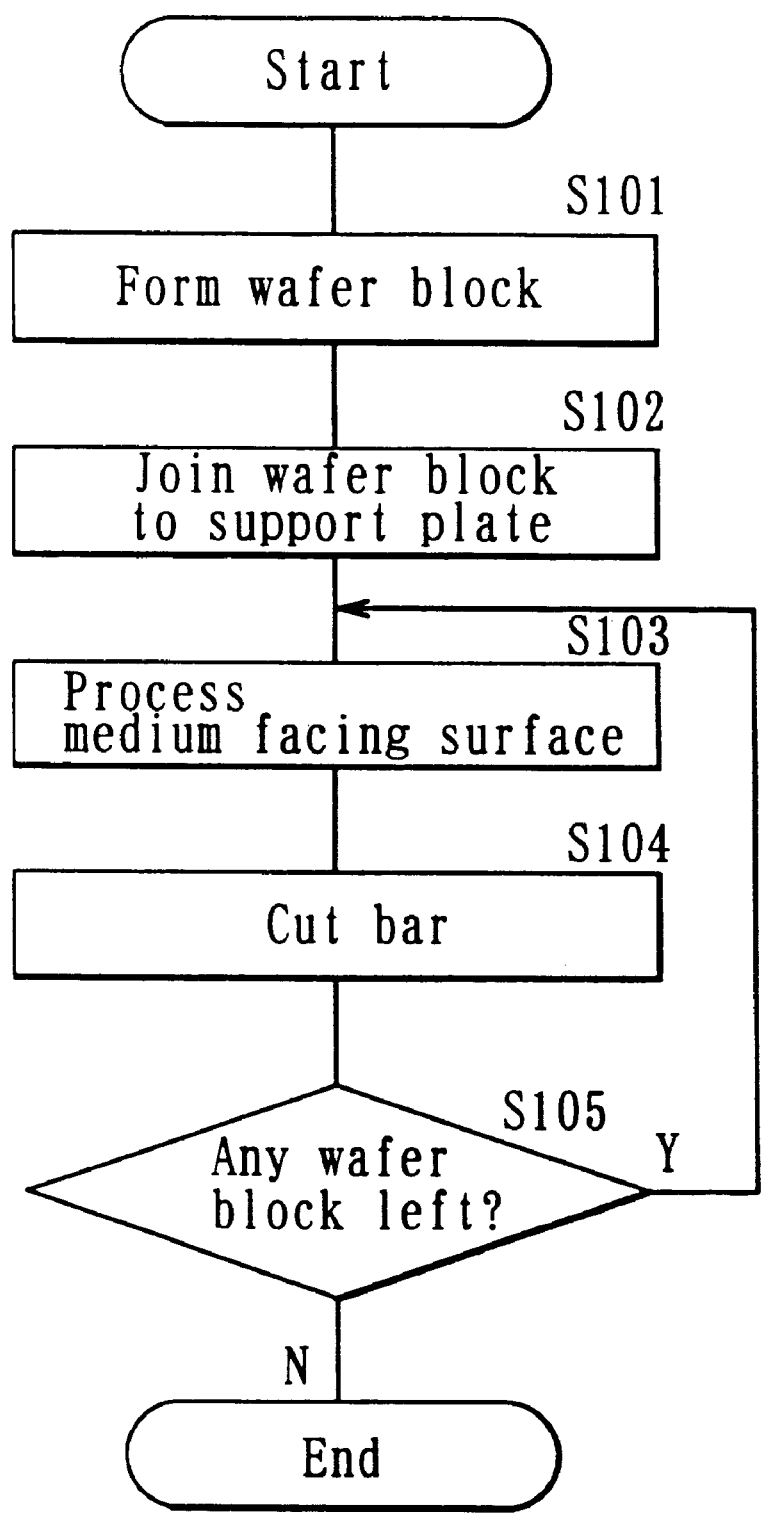
FIG. 2 is a flowchart for illustrating a method of manufacturing sliders of the embodiment of the invention.

Reference is now made to a flowchart shown in FIG. 2 to describe the method of manufacturing sliders of the embodiment. In the method, the wafer block 21 is first formed out of a wafer in which a plurality of rows of slider sections each including a thin-film magnetic head element are aligned (step S101). Next, the wafer block 21 is joined to the support plate 22 (step S102). Specific processing is then performed on the medium facing surfaces of a row of slider sections located in the medium facing surface of the wafer block 21 joined to the support plate 22 (step S103). The wafer block 21 and the support plate 22 are cut together so that the row of slider sections whose medium facing surfaces have received the specific processing are separated from the wafer block 21 to be the bar 51 (step S104). Next, whether any wafer block 21 remains is determined (step S105). If any wafer block 21 remains (Y), the process returns to step S103. If no wafer block 21 remains (N), the process relating to manufacturing the bar 51 is terminated. In FIG. 2, steps S101 and S102 correspond to the first step and steps S103 to S105 correspond to the second step.

The steps shown in FIG. 2 will now be specifically described in order.

Figure 3:
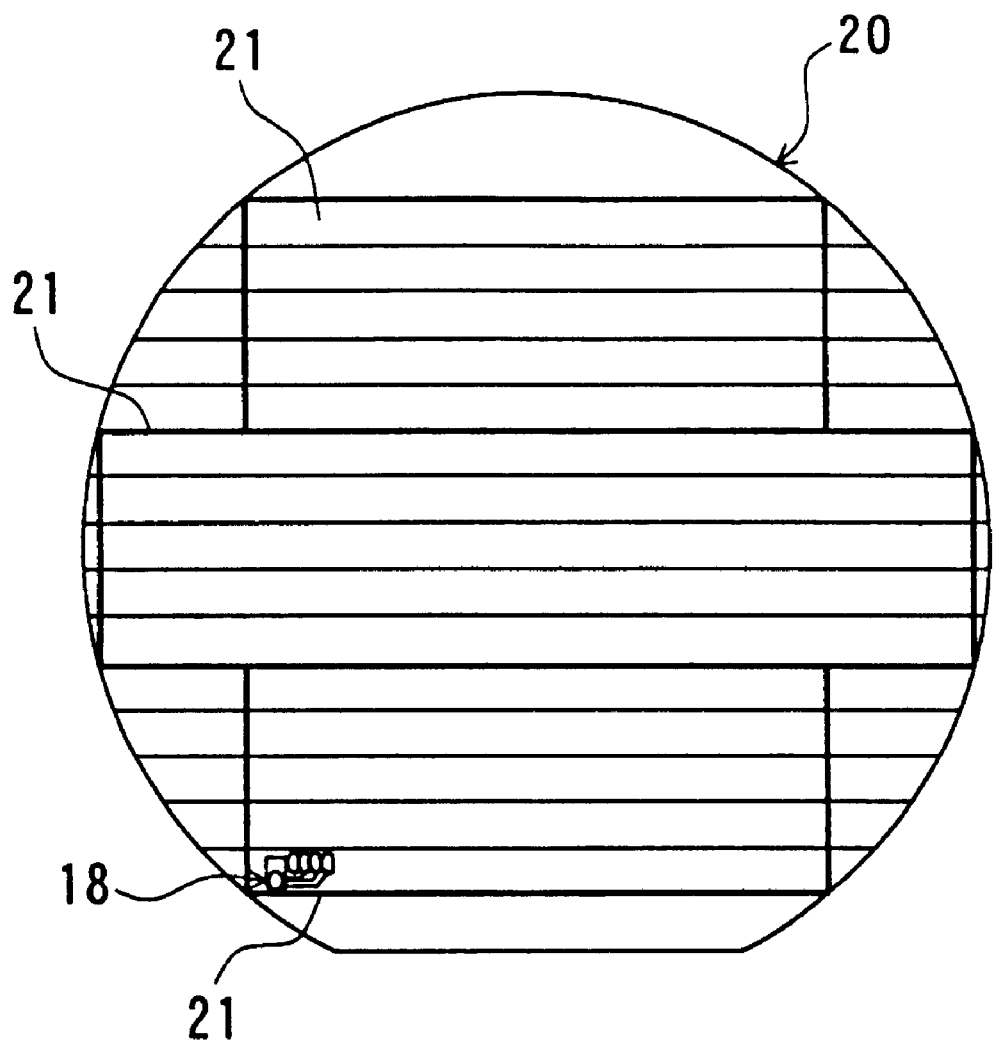
FIG. 3 is a view for illustrating the step of fabricating a wafer block of the embodiment of the invention.

Reference is made to FIG. 3 to describe the step of forming the wafer block 21 (step S101 of FIG. 2). FIG. 3 shows a wafer 20 in which a plurality of rows of slider sections each including a thin-film magnetic head element 18 are aligned. The main part of the wafer 20 is made of aluminum oxide and titanium carbide ($Al_2O_3$—TiC), for example. Portions surrounding the head elements 18 are made of alumina ($Al_2O_3$), for example. In this embodiment the wafer 21 is cut into a plurality of wafer blocks 21 in which a plurality of rows of slider sections are aligned. The shape of each wafer block 21 is a plate whose surface (shown in FIG. 3) including surfaces of all the slider sections is rectangular. In the embodiment the number of rows of slider sections that the wafer block 21 includes may be at least two. The number is preferably at least four and more preferably falls within the range between 10 and 20.

Figure 4A:
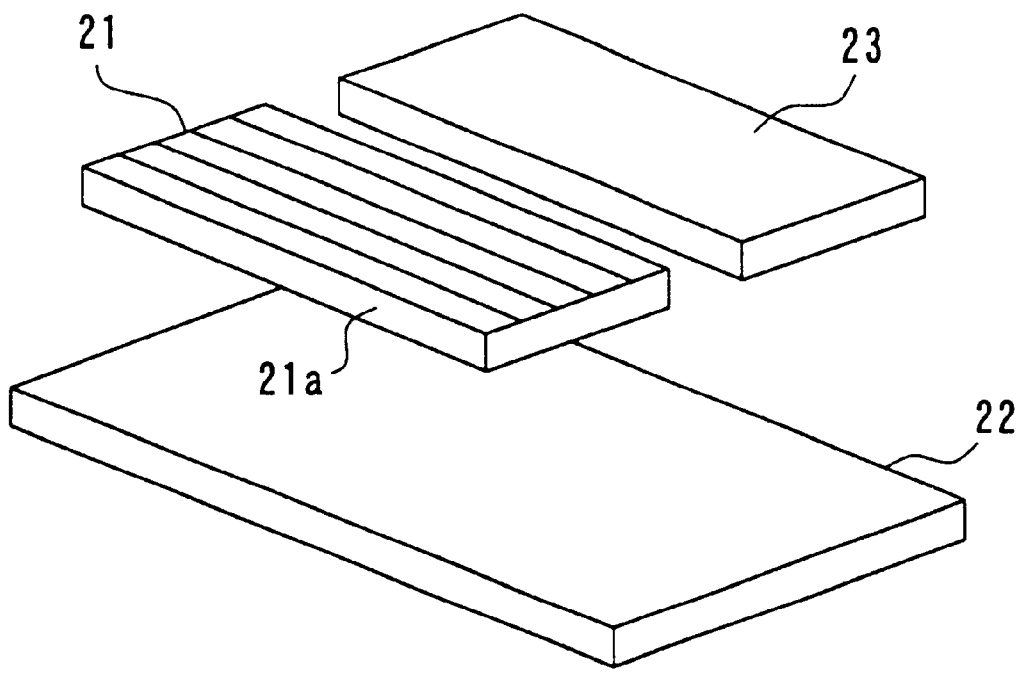
FIG. 4A and FIG. 4B are perspective views for illustrating the step of joining the wafer block to a support plate of the embodiment of the invention.
Figure 4B:
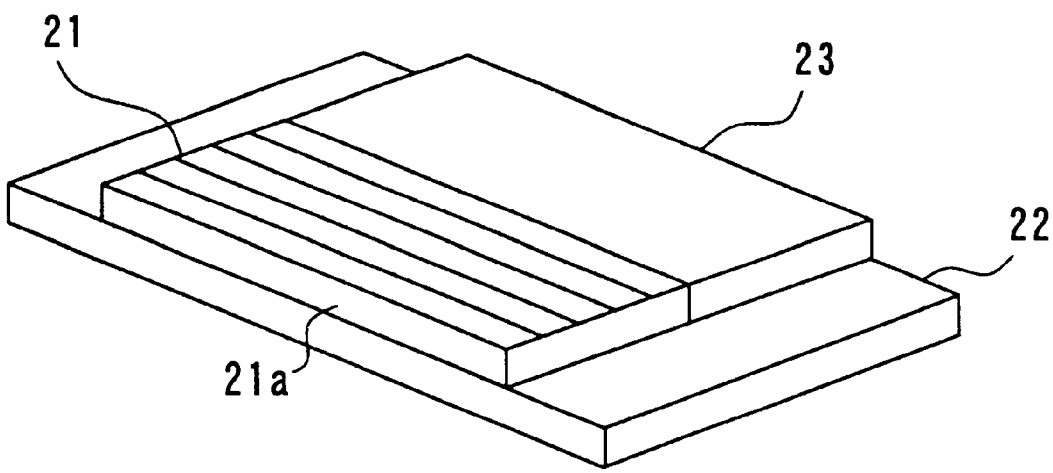

Reference is now made to FIG. 4A and FIG. 4B, FIG. 5A and FIG. 5B, FIG. 6, FIG. 7, FIG. 8A and FIG. 8B, and FIG. 9A and FIG. 9B to describe the step of joining the wafer block 21 to the support plate 22 (step S102 of FIG. 2). In the step, as shown in FIG. 4A, the wafer block 21, the support plate 22 for supporting all the slider sections of the wafer block 21, and the dummy block 23 for assisting in supporting the wafer block 21 are prepared and they are joined to one another as shown in FIG. 4B. To be specific, the wafer block 21 is placed on the support plate 22 such that the surface of the wafer block 21 including surfaces of all the slider sections faces the top face of the support plate 22. On the support plate 22, the dummy block 23 is placed on the side of the wafer block 21 opposite to a medium facing surface 21a. The surface of the wafer block 21 and the surface of the support plate 22 facing each other, the surface of the wafer block 21 and the surface of the dummy block 23 facing each other, and the surface of the dummy block 23 and the surface of the support plate 22 facing each other, are bonded to each other with an adhesive, respectively. When joined to the support plate 22, the wafer block 21 is placed such that the surface opposite to the surface in which the head elements 18 are formed faces the support plate 22.

Since the support plate 22 is required to support all the slider sections of the wafer block 21, it is necessary that the width of the support plate 22 in the orientation of the rows of slider sections of the wafer block 21 is equal to or greater than the width of the wafer block 21. In particular, the width of the support plate 22 is preferably greater than the width of the wafer block 21. This is because, if the width of the support plate 22 is greater than the width of the wafer block 21, handling of the wafer block 21 is made easier since, for example, it is possible to fix the wafer block 21 to a jig though the support plate 22 without directly touching the wafer block 21 when specific processing is performed on the wafer block 21 joined to the support plate 22. It is preferred that the width of the support plate 22 is at least about 2 to 3 mm greater than the width of the support plate 21 on one side and about at least 4 to 6 mm greater in total. The thickness of the support plate 22 is appropriately determined considering the strength, ease of handling and so on.

The material of the support plate 22 is preferably ceramic that allows the plate 22 to be cut with precision considering that the plate 22 is cut together with the wafer block 21. Since the great areas of the wafer block 21 and the support plate 22 are in contact with each other and joined to each other and, the wafer block 21 and the support plate 22 are heated if a thermoplastic adhesive is used, the material of the support plate 22 is preferably one whose thermal expansion rate is close to that of the wafer block 21. In particular, the material of the support plate 22 is preferably the same as that of the main part of the wafer block 21, that is, aluminum oxide and titanium carbide, for example. Since the conditions for cutting depend on an object to process, the conditions for cutting are easily determined if the material of the support plate 22 is the same as that of the main part of the wafer block 21. The material of the support plate 22 is preferably the same as that of the main part of the wafer block 21 in this respect, too.

The width of the dummy block 23 in the orientation of the rows of slider sections of the wafer block 21 may be close to the width of the wafer block 21. In particular, the width of the dummy block 23 is preferably equal to the width of the wafer block 21 in order to facilitate handling. The thickness of the dummy block 23 is preferably similar to the thickness of the wafer block 21.

Figure 5A:
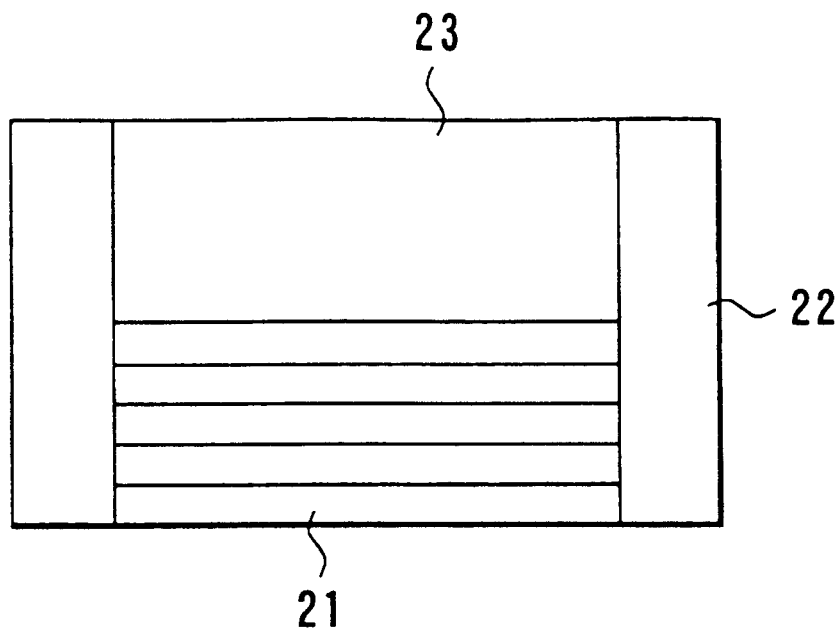
FIG. 5A and FIG. 5B are views for illustrating handling of the wafer blocks having different widths in the embodiment of the invention.
Figure 5B:
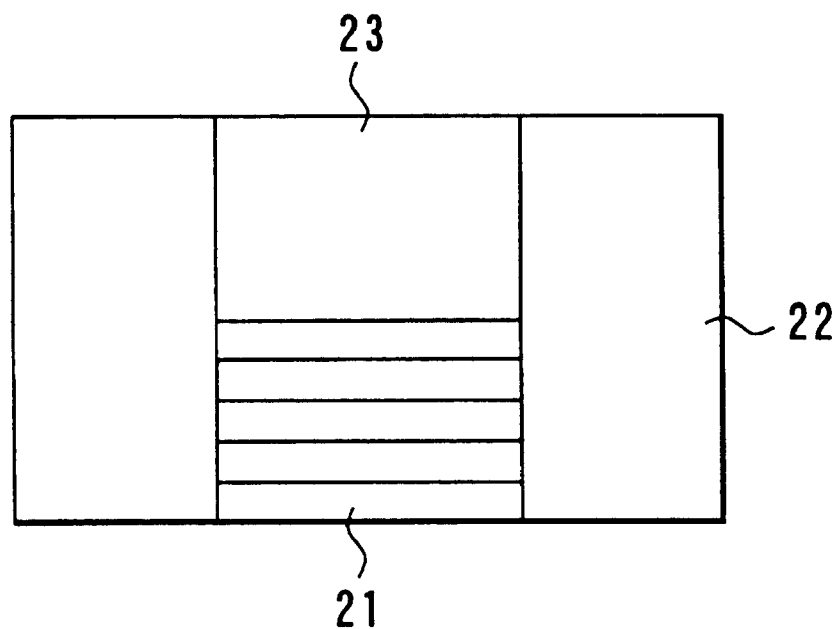

Since the wafer blocks 21 are cut out of the circular wafer 20 as shown in FIG. 3, there may be the wafer block 21 great in width as shown in FIG. 5A and the wafer block 21 small in width as shown in FIG. 5B. Therefore, it is preferred that some dummy blocks 23 whose widths are different from one another are prepared to conform to the widths of the wafer blocks 21 and that the dummy block 23 equal to the wafer block 21 in width is joined to the wafer block 21.

The material of the dummy block 23 may be one having some degree of strength and hard to deform and preferably ceramic that is able to be formed with precision such as aluminum oxide and titanium carbide, alumina, or zirconia ($ZrO_2$). Since the wafer block 21 and the dummy block 23 are heated if a thermoplastic adhesive is used, the material of the dummy block 23 is preferably one whose thermal expansion rate is close to that of the wafer block 21. In particular, the material of the dummy block 23 is preferably the same as that of the main part of the wafer block 21, that is, aluminum oxide and titanium carbide, for example.

Figure 6:
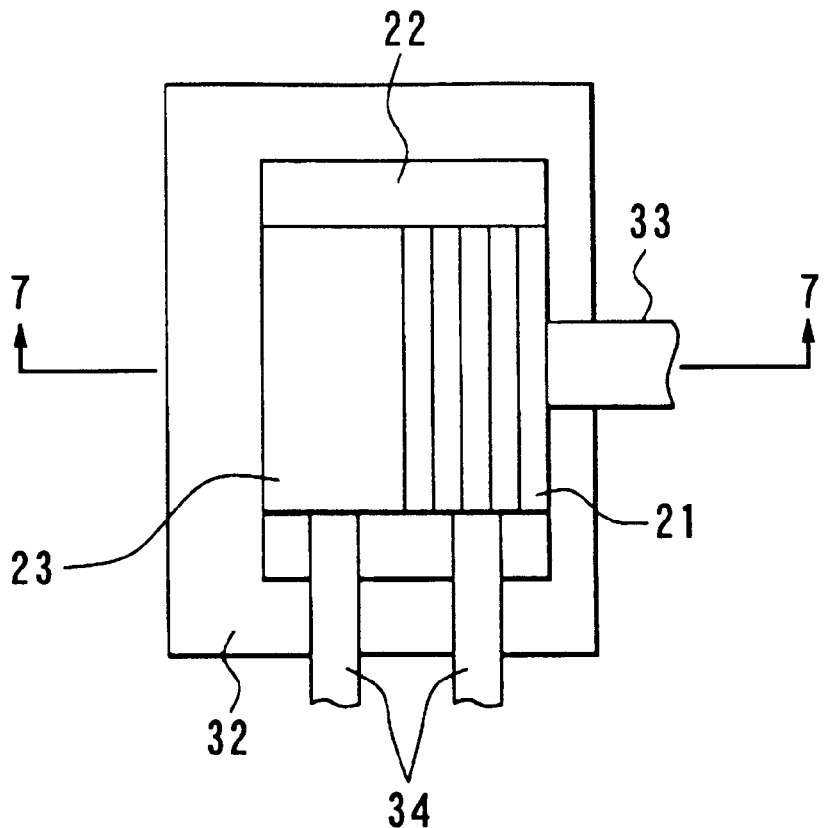
FIG. 6 is a top view for illustrating the state of the wafer block, the support plate and a dummy block when bonded.
Figure 7:
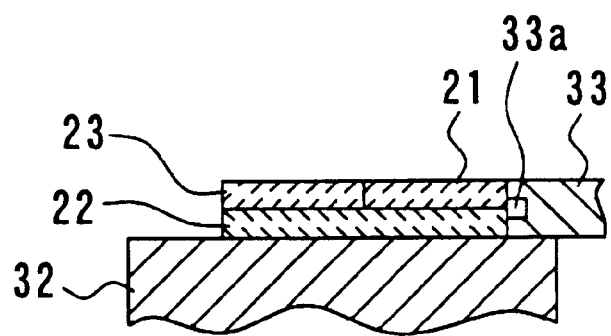
FIG. 7 is a cross section taken along line 7—7 of FIG. 6.

Reference is now made to FIG. 6 and FIG. 7 to describe an example of an alignment method for joining the wafer block 21, the support plate 22 and the dummy block 23 to one another. FIG. 6 is a top view for illustrating the state of the wafer block 21, the support plate 22 and the dummy block 23 when joined to one another. FIG. 7 is a cross section taken along line 7—7 of FIG. 6. In this example a board 32 is used for alignment of the wafer block 21, the support plate 22 and the dummy block 23. Defining sections 33 and 34 are provided on the board 32. The defining section 33 defines the position of the wafer block 21 and the support plate 22 in the direction orthogonal to the orientation of the rows of slider sections of the wafer block 21. The defining sections 34 define the position of the wafer block 21 and the dummy block 23 along the orientation of the rows of slider sections.

For fixing the wafer block 21, the support plate 22 and the dummy block 23 to one another, an adhesive is applied to at least one of the surfaces thereof to be bonded to each other. As shown in FIG. 6 and FIG. 7, the support plate 22 is placed on the board 32, and the wafer block 21 and the dummy block 23 are then placed on the support plate 22. The ends of the wafer block 21 and the support plate 22 parallel to the orientation of the rows of the slider sections are pressed against the defining section 33. The ends of the wafer block 21 and the support plate 22 orthogonal to the orientation of the rows of the slider sections are pressed against the defining sections 34. As a result, the ends of the wafer block 21 and the support plate 22 parallel to the orientation of the rows of the slider sections are aligned and the ends of the wafer block 21 and the support plate 22 orthogonal to the orientation of the rows of the slider sections are aligned. In this state the wafer block 21, the support plate 22 and the dummy block 23 are bonded to one another. As shown in FIG. 7, the defining section 33 is located in the position that touches the ends of the wafer block 21 and the support plate 22. The defining section 33 has a groove 33a in a portion corresponding to the interface between the wafer block 21 and the support plate 22, for releasing the adhesive. The defining sections 34 do not touch the support plate 22 but are located in the positions that only touch the ends of the wafer block 21 and the dummy block 23, respectively.

An adhesive used for bonding the wafer block 21, the support plate 22 and the dummy block 23 is appropriately chosen from thermoplastic adhesives, cyanoacrylic-base adhesives and so on, depending on the materials and so on of the wafer block 21, the support plate 22 and the dummy block 23.

Reference is now made to FIG. 8A and FIG. 8B and FIG. 9A and FIG. 9B to describe an example of the surface configurations of the support plate 22 and the dummy block 23. FIG. 8A is a top view of the support plate 22. FIG. 8B is a side view of the support plate 22. FIG. 9A is a top view of the dummy block 23. FIG. 9B is a side view of the dummy block 23. In this example as shown, a plurality of grooves 36 are formed in the surface of the support plate 22 to be joined to the wafer block 21, for releasing an adhesive used for bonding the plate 22 to the wafer block 21. A plurality of grooves 37 are formed in the surface of the dummy block 23 to be joined to the wafer block 21, for releasing an adhesive used for bonding the dummy block 23 to the wafer block 21.

Through providing the grooves 36 and 37, the layers of adhesives are made thin between the wafer block 21 and the support plate 22 and between the wafer block 21 and the dummy block 23. As a result, the strength of the wafer block 21, the support plate 22 and the dummy block 23 bonded to one another is increased.

It is preferred that the grooves 36 of the support plate 22 are formed to extend in the direction orthogonal to the orientation of the rows of slider sections of the wafer block 21. This is because such formation of the grooves 36 allows the area of each bar 51 and the area of a piece of the support plate 22 bonded to each other to be equal when the wafer block 21 is cut into the bars 51.

It is preferred that the grooves 36 are formed with pitches equal to the pitches of the slider sections in the rows in the wafer block 21. Furthermore, it is preferred that the wafer block 21 and the support plate 22 are aligned such that the grooves 36 thus formed are each placed in the position between the neighboring slider sections of the rows in the wafer block 21. This is because such arrangement allows the area of each slider section and the area of a portion of the support plate 22 bonded to each other to be equal. The pitch of the slider sections in each row is about 1 mm, for example.

It is preferred that the grooves 37 of the dummy block 23 are formed with pitches equal to the pitches of the slider sections in the rows in the wafer block 21 as the groove 36 of the support plate 22. Furthermore, it is preferred that the wafer block 21 and the dummy block 23 are aligned such that the grooves 37 thus formed are each placed in the position between the neighboring slider sections in the rows in the wafer block 21.

Preferably, the depth and width of the grooves 36 and 37 are both about 0.1 to 0.2 mm.

Figure 10:
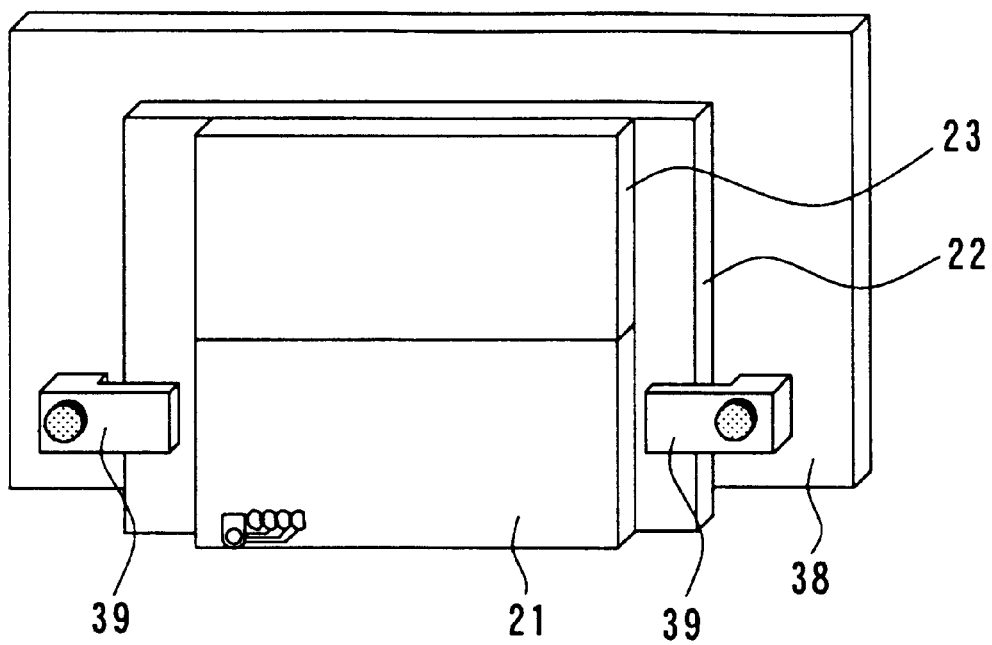
FIG. 10 is a perspective view for illustrating the state of the wafer block, the support plate and the dummy block fastened to a holder.
Figure 11:
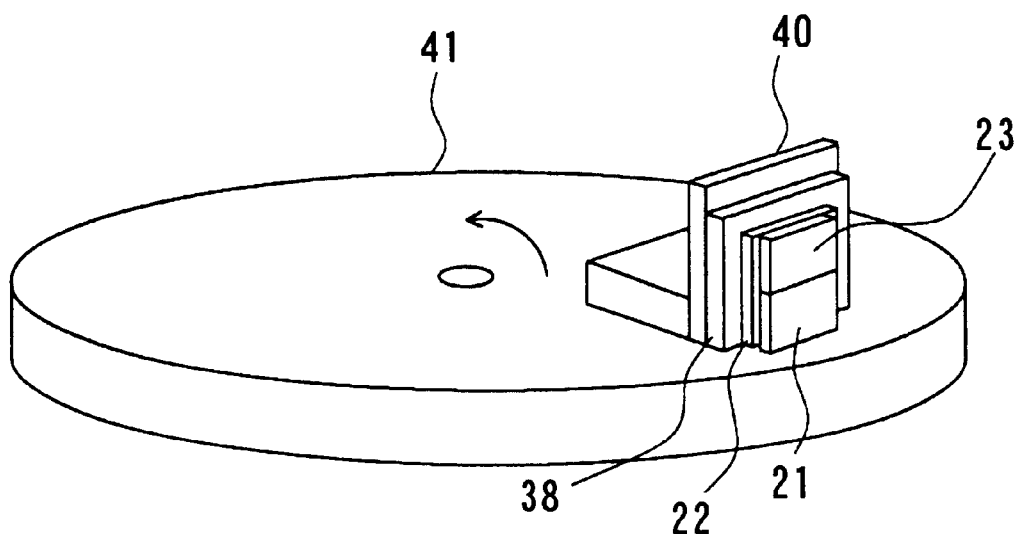
FIG. 11 is a perspective view for illustrating the step of performing a specific processing on the medium facing surface of the wafer block in the embodiment of the invention.

Reference is now made to FIG. 10 and FIG. 11 to describe the step of performing specific processing on the medium facing surfaces of a row of slider sections in the medium facing surface of the wafer block 21 joined to the support plate 21 (step S103 of FIG. 2). In this step, grinding using a grinding apparatus, lapping using a lapping apparatus and so on are performed. Finally, the resistance of the MR elements, the MR height and the throat height are precisely defined.

As shown in FIG. 10, to perform the above-stated step in this embodiment, the wafer block 21, the support plate 22 and the dummy block 23 joined to one another are fastened to a holder 38 as a processing jig. When fastened, the support plate 22 is held with clamps 39, for example. As a result, the wafer block 21 is fastened to the holder 38 without directly touching the wafer block 21.

FIG. 11 briefly illustrates the step of lapping the medium facing surfaces of a row of slider sections in the medium facing surface of the wafer block 21. In this step, the holder 38 to which the wafer block 21, the support plate 22 and the dummy block 23 are fastened as shown in FIG. 10 is attached to a section 40 for holding an object to lap provided in the lapping apparatus. The holder 38 is then placed on a lapping surface plate 41 and the rotating surface plate 41 laps the medium facing surfaces of the row of slider sections in the medium facing surface of the wafer block 21. When lapped, the amount of lapping is controlled through an electrical lapping guide or an optical lapping guide to precisely define the resistance of each MR element, the MR height and the throat height.

Reference is now made to FIG. 12 to FIG. 22 to describe the step of cutting the wafer block 21 and the support plate 22 (step S104 of FIG. 2).

Figure 12:
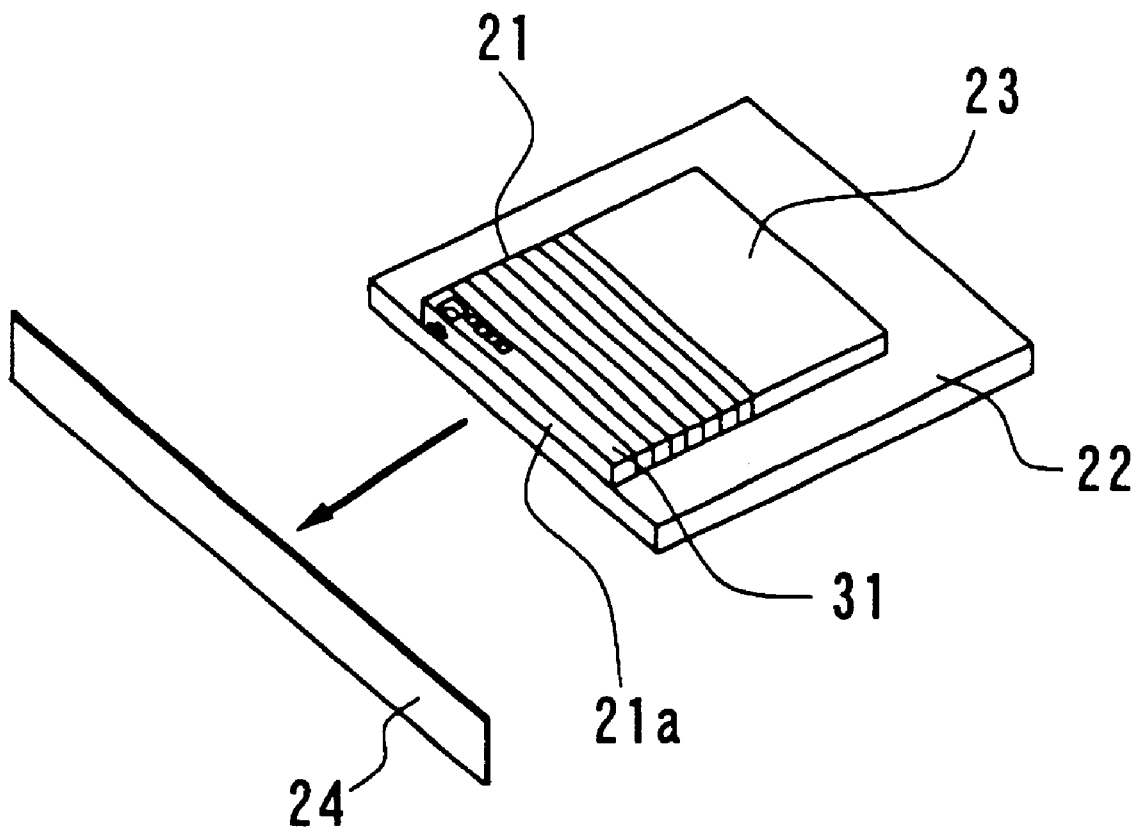
FIG. 12 is a perspective view for illustrating the way in which a tape is bonded to the medium facing surface of the wafer block in the embodiment of the invention.

In this step, as shown in FIG. 12, the wafer block 21 and the support plate 22 are cut together so that a row of slider sections 31 whose medium facing surface 21a has received the specific processing is separated from the wafer block 21 to be the bar 51. In this embodiment the tape 24 is placed to cover the medium facing surface 21a of the wafer block 21 and the end face of the support plate 22 processed with the medium facing surface 21a in order to protect the medium facing surface 21a when the wafer block 21 and the support plate 22 are cut. It is preferred that the tape 24 is adhesive and put on the medium facing surface 21a and the end face of the support plate 22 before cutting. The tape 24 preferably has elasticity to relieve a shock to the medium facing surface 21a.

The wafer block 21, the support plate 22 and the dummy block 23 with the tape 24 on are placed on the support plate holding section 6 of the processing apparatus shown in FIG. 1.

Figure 13:
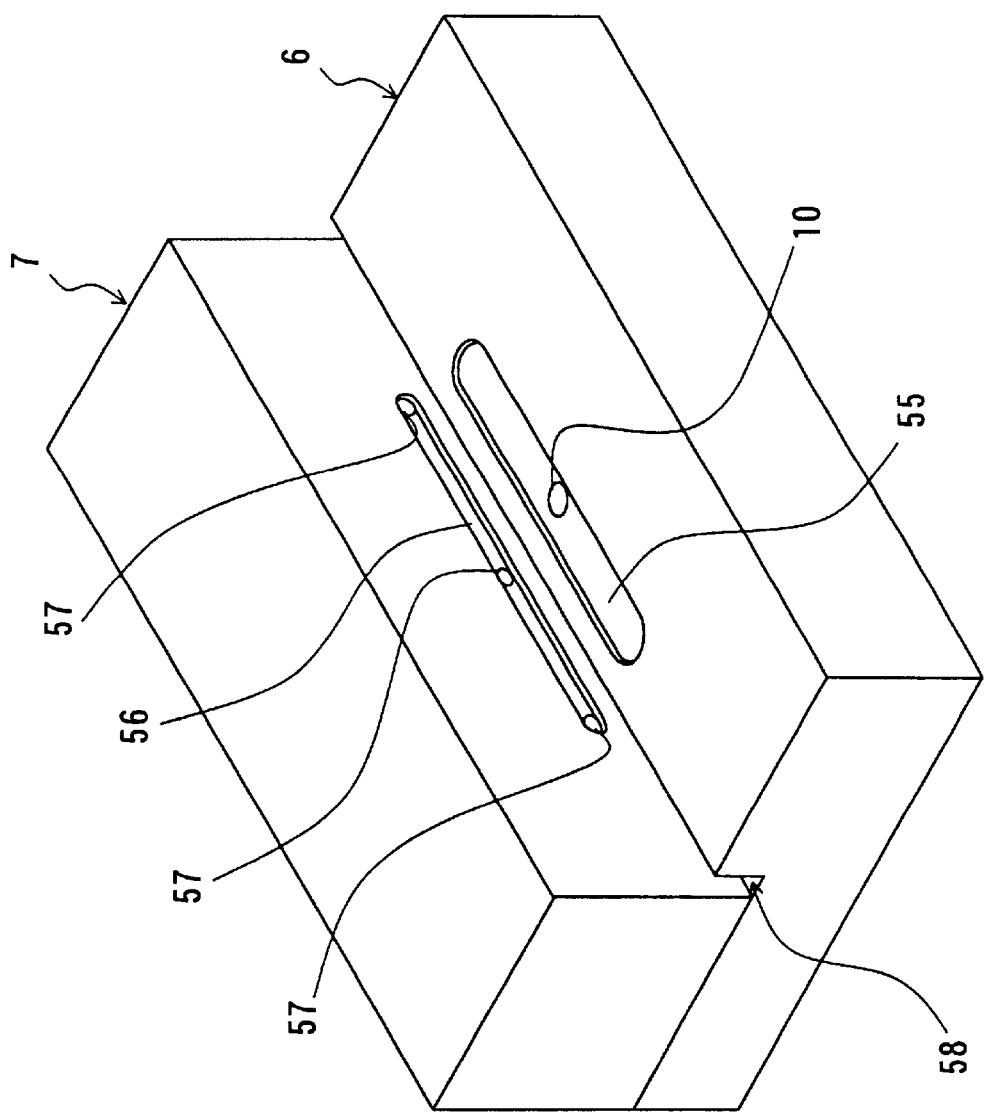
FIG. 13 is a perspective view of a support plate holding section and a tape holding section of the processing apparatus shown in FIG. 1.
Figure 14:
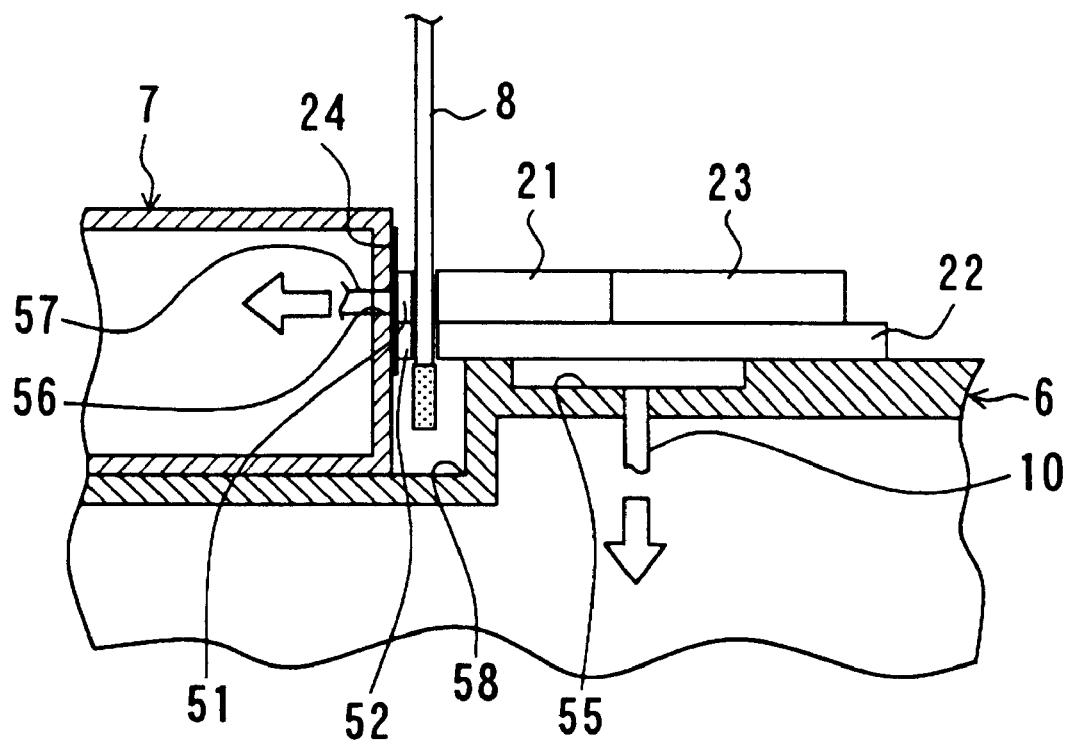
FIG. 14 is a cross section of the support plate holding section and the tape holding section of the processing apparatus shown in FIG. 1.

FIG. 13 is a perspective view of the support plate holding section 6 and the tape holding section 7 of the processing apparatus shown in FIG. 1. FIG. 14 is a cross section of the support plate holding section 6 and the tape holding section 7. As shown, an absorbing section 55 made up of an elliptical concavity is formed in the top surface of the support plate holding section 6. The absorbing tube 10 communicates with the absorbing section 55. An absorbing section 56 made up of an elliptical concavity is formed where the tape 24 is applied in the tape holding section 7. An absorbing tube 57 communicates with the absorbing section 56. In the example shown in FIG. 13, an end of the tube 57 is divided into three branches and ends of the three branches are connected to the absorbing section 56. The tubes 10 and 57 are each connected to an absorbing apparatus not shown.

The wafer block 21, the support plate 22 and the dummy block 23 with the tape 24 on placed on the support plate holding section 6 are fastened to the support plate holding section 6 and the tape holding section 7 while the support plate 22 is absorbed by the absorbing section 55 and the tape 24 is absorbed by the absorbing section 56. In this state, as shown in FIG. 14, the wafer block 21 and the support plate 22 are cut together with the blade 8 so that the row of slider sections 31 whose medium facing surface 31a has received the specific processing is separated from the wafer block 21 to be the bar 51. A grinding liquid is sprayed on the portion to be cut. After the cutting, the bar 51 and a piece 52 of the support plate 22 together with the tape 4 are held by the tape holding section 7. A concavity 58 in which the tip of the blade 8 is placed is formed in the position facing the blade 8 between the support plate holding section 6 and the tape holding section 7.

Figure 19:
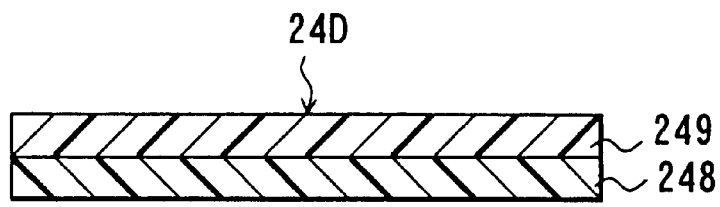
FIG. 19 is a cross section of still another example of the tape of the embodiment of the invention.
Figure 20:
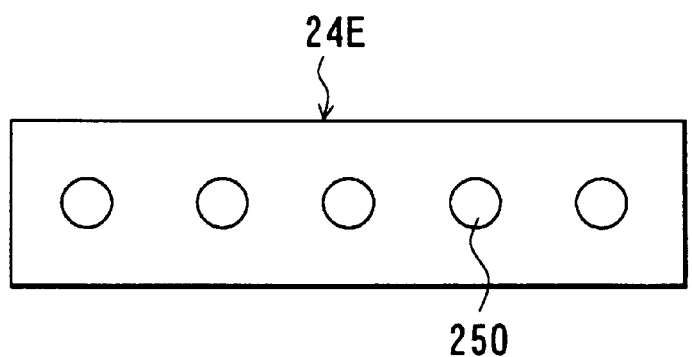
FIG. 20 is a top view of still another example of the tape of the embodiment of the invention.

FIG. 15 to FIG. 20 illustrate some types of the tape 24. FIG. 15, FIG. 16, FIG. 17 and FIG. 19 are cross sections orthogonal to the length of the tapes. FIG. 20 is a top view of the tape.

Figure 15:
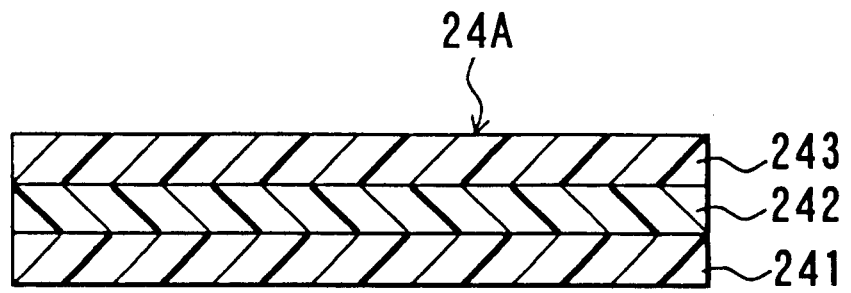
FIG. 15 is a cross section of an example of a tape of the embodiment of the invention.

A tape 24A shown in FIG. 15 is layers of a base 241, an adhesive layer 242, and a separator (cover film) 243 stacked in this order. The total thickness of the tape 24A is about 0.1 mm. The material of the bade 241 may be an organic material such as polyvinyl chloride (PVC), polyethylene terephthalate (PET), or a polyolefin-base material or may be paper or cloth. The adhesive making up the adhesive layer 242 may be an organic adhesive such as a generally-used acrylic-base adhesive.

When the tape 24A shown in FIG. 15 is used, the separator 243 is peeled off. End faces of the wafer block 21 and the support plate 22 are bonded to the adhesive layer 242 thereby exposed.

The tape 24A may be an ultraviolet (UV)-setting tape whose adhesive layer 242 is made of an ultraviolet-setting material. Such an ultraviolet-setting tape may be an ultraviolet-setting dicing tape 'D-series' (a trade name) manufactured by LINTEC Corporation, for example. If an ultraviolet ray is applied to such an ultraviolet-setting tape, the adhesiveness of the adhesive layer 242 is reduced. Therefore, through the use of such a tape for the tape 24A, the tape 24A is easily peeled off from the bar 51 without leaving a trace of the adhesive (called an adhesive transfer in the following description) by applying an ultraviolet ray to the tape 24A.

The tape 24A may be a thermopeeling tape made of a thermopeeling material. Such a tape may be 'SKY SHEET' (a trade name) manufactured by Nikka Seiko Co., Ltd. or 'REVALPHA' (a trade name) manufactured by Nitto Denko Corporation, for example. If such a thermopeeling tape is heated, the adhesiveness of the adhesive layer is reduced. Therefore, through the use of such a tape for the tape 24A, the tape 24A is easily peeled off from the bar 51 without an adhesive transfer by heating the tape 24A.

The tape 24A may be an antistatic tape whose base 241 contains a conductive substance and has an antistatic function. One of such antistatic tapes is 'ELEGRIP E-series' (a trade name) manufactured by TOYO CHEMICAL Co., Ltd.. Through using such an antistatic tape for the tape 24A and protecting the medium facing surfaces of the slider sections, static damage to the slider sections of the bar 51 such as static damage to the thin-film magnetic head elements in the bar 51 due to human handling and so on, in particular, is prevented.

Figure 16:
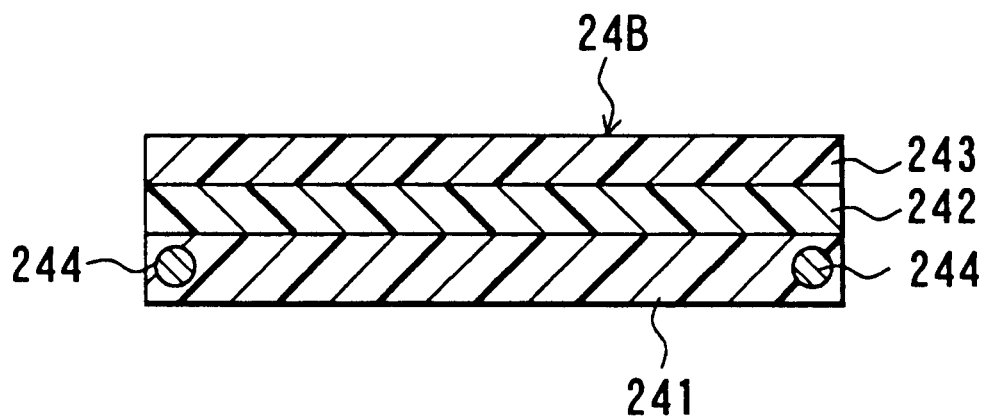
FIG. 16 is a cross section of another example of the tape of the embodiment of the invention.

A tape 24B shown in FIG. 16 is one whose base 241 contains wires 244 for reinforcing strength. The other configuration and functions thereof are similar to those of the tape 24A shown in FIG. 15. The material of the wires 244 may be Nylon (a trade name) or a metal.

Figure 17:
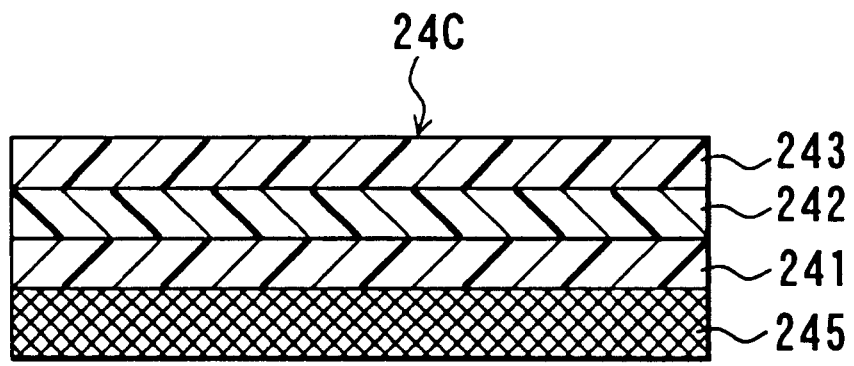
FIG. 17 is a cross section of still another example of the tape of the embodiment of the invention.
Figure 18:
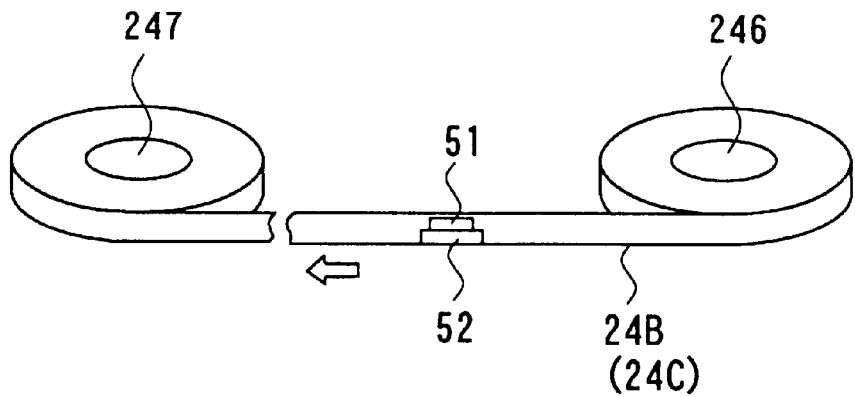
FIG. 18 is a view for illustrating an example of automatically transferring a bar through the use of the tape in the embodiment of the invention.

A tape 24C shown in FIG. 17 is one to which a reinforcing layer 245 for strength is bonded to the surface of the base 241 opposite to the adhesive layer 242. The other configuration and functions thereof are similar to those of the tape 24A shown in FIG. 15. The material of the reinforcing layer 245 may be Nylon (a trade name) or paper.

If any of the reinforced tapes 24B and 24C shown in FIG. 16 and FIG. 17, respectively, is used, the tape 24B or 24C is transferred such that the tape 24B or 24C wound around one reel 246 is taken up around another reel 247. The tape 24B or 24C is transferred while the bar 51 and the piece 52 of the support plate 22 are bonded to the tape 24B or 24C. The separated bar 51 and the piece 52 are thereby automatically transferred.

A tape 24D shown in FIG. 19 utilizes a dry film resist used for photolithography. The tape 24D is layers of a resist layer 248 made of a photoresist material and a cover film 249. Such a dry film resist may be 'VANX DRY FILM PHOTO-RESIST U-120' (a trade name) manufactured by Fujifilm Olin Co., Ltd., for example. If such a dry film resist is used for the tape 24D, the end faces of the wafer block 21 and the support plate 22 are bonded to the resist layer 248 by thermocompression, for example.

A tape 24E shown in FIG. 20 is one without an adhesive layer, that is, a tape having no adhesiveness. The material of the tape 24E may be the same as that of the base 241 of the tape 24A. The tape 24E has a plurality of holes 250 along its length. When the wafer block 21 and the support plate 22 are cut, the tape 24E is placed between the end faces of the wafer block 21 and the support plate 22 and the absorbing section 56 of the tape holding section 56. If air is absorbed by the absorbing section 56 through the tube 57 in this state, the end faces of the wafer block 21 and the support plate 22 are sucked toward the absorbing section 56 through the holes 250 of the tape 24E. As a result, the tape 24E is held between the absorbing section 56 and the end faces of the wafer block 21 and the support plate 22.

The wafer block 21 and the support plate 22 having been cut and the bar 51 and the piece 52 having been obtained, processing of the medium facing surface (step S103 of FIG. 2) and cutting of the wafer block 21 and the support plate 22 (step S104 of FIG. 2) are repeated as long as the wafer blocks 21 remain. A processing marker as the reference of a cutting position is provided on the surface of the wafer block 21 in which the thin-film magnetic head elements are formed. The cutting position is determined with reference to the marker when the wafer block 21 and the support plate 22 are cut.

Figure 21:
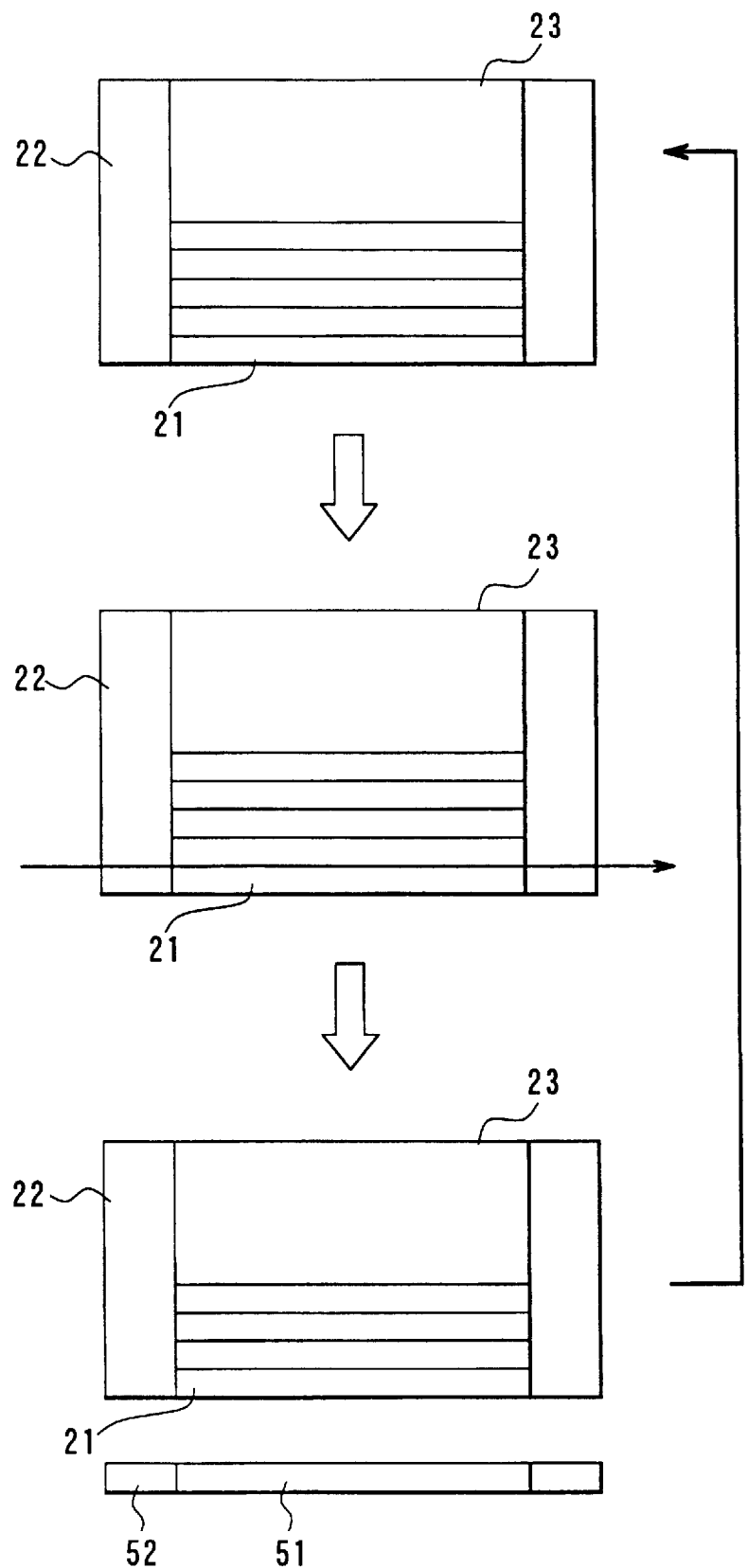
FIG. 21 is a view for illustrating the steps of processing the medium facing surface of the wafer block and cutting the wafer block of the embodiment of the invention.

FIG. 21 illustrates repetition of steps S103 and S104 described above. The top figure of FIG. 21 illustrates processing of the medium facing surface of the wafer block 21 bonded to the support plate 22. This processing having completed, the wafer block 21 and the support plate 22 are cut together so that a row of slider sections whose medium facing surfaces have been processed are separated from the wafer block 21 to be the bar 51, as shown in the figure in the middle of FIG. 21. The bar 51 and the piece 52 of the support plate 22 thereby obtained are transferred to the post-step, as shown in the bottom figure of FIG. 21. If any wafer block 21 remains, processing of the medium facing surface thereof is repeated as shown in the top figure of FIG. 21.

Figure 22:
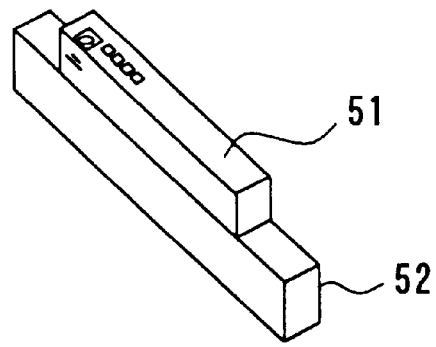
FIG. 22 is a perspective view of the bar and a piece of the support plate of the embodiment of the invention.

FIG. 22 illustrates the bar 51 and the piece 52 of the support plate 22 obtained through cutting the wafer block 21 and the support plate 22 together. In the processing apparatus shown in FIG. 1, the bar 51 and the piece 52 are held by the tape holding section 7 together with the tape 24 after the wafer block 21 and the support plate 22 are cut. In the processing apparatus, the moving section 5 moves toward the storage section 2 and the vacuum tweezers 14 move toward the cutting mechanism section 1. The vacuum tweezers 14 hold the bar 51 and the piece 52 and place them in the tray 13. The vacuum tweezers 14 hold the bar 51 and the piece 52 by absorbing the piece 52.

Reference is now made to FIG. 23 to FIG. 29 to describe the post-step performed on the bar 51.

Figure 23:
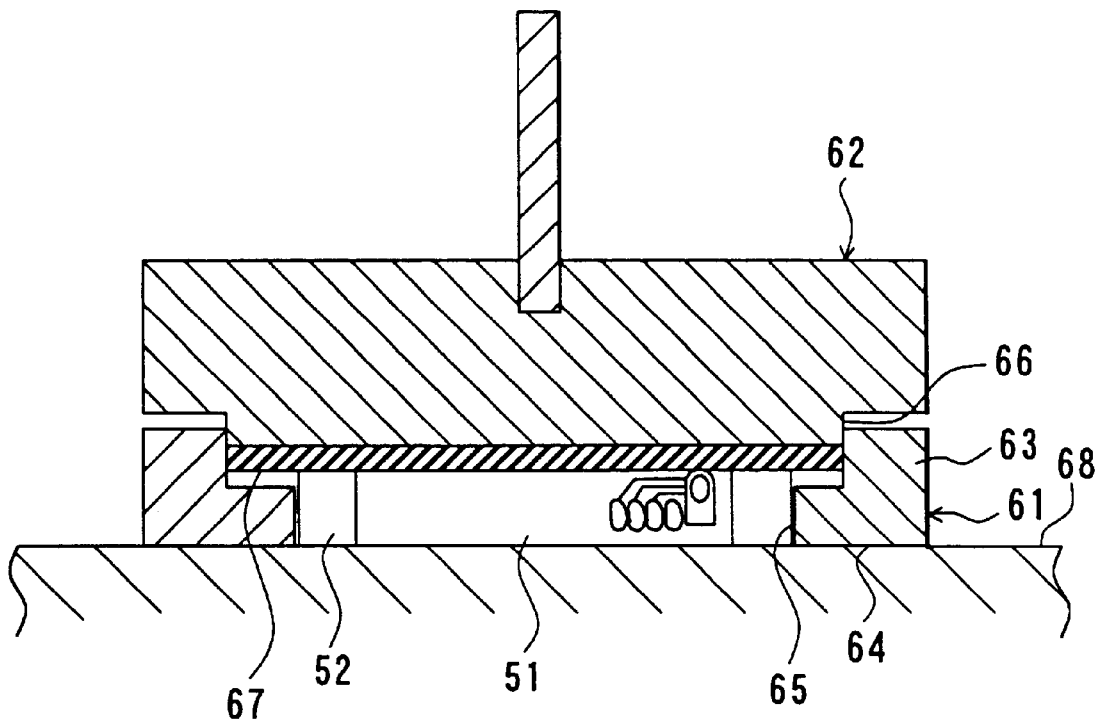
FIG. 23 is a cross section for illustrating the state of the bar mounted on a lapping jig for eliminating curvatures of the bar separated in the embodiment of the invention.
Figure 24:
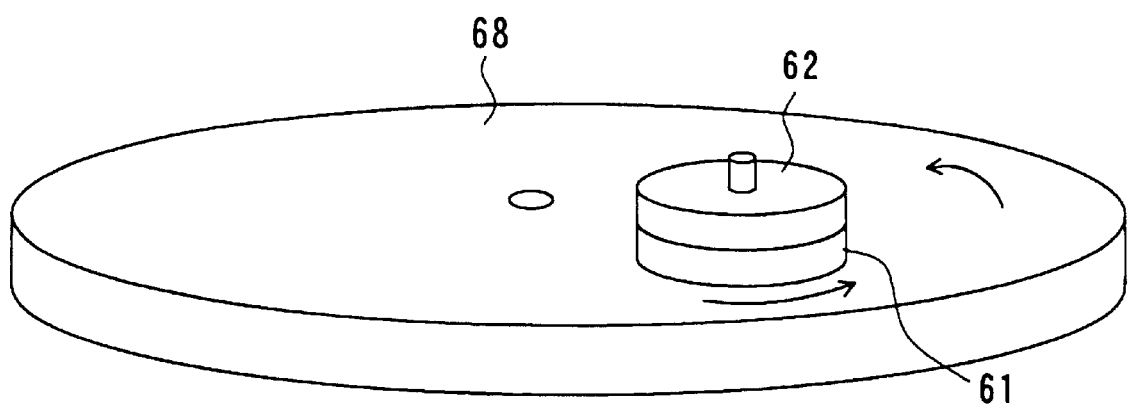
FIG. 24 is a perspective view for illustrating the step of eliminating curvatures of the bar separated in the embodiment of the invention.

In this embodiment, the surface of the bar 51 opposite to the medium facing surface is lapped to reduce warpage in the cut section, that is, in the surface opposite to the medium facing surface. FIG. 23 and FIG. 24 are cross sections that illustrate the state in which the bar 51 is mounted on the jig for lapping. As shown, the jig comprises a carrier 61 and a load application member 62. The carrier 61 has a cylindrical section 63 in the shape of a thick cylinder and a circular plate section 64 in the shape of a disk to block the bottom end of the cylindrical section 63. The circular plate section 64 has a plurality of holes 65 in which an object to process is placed. The load application section 62 has a protrusion 66 that is inserted to the cylindrical section 63 of the carrier 61. A pad 67 is attached to the bottom end of the protrusion 66.

To lap the surface of the bar 51 opposite to the medium facing surface, the carrier 61 is placed on a lapping surface plate 68 and the bar 51 and the piece 52 are placed in the hole 65 of the circular plate section 64 of the carrier 61 with the surface opposite to the medium facing surface down. The protrusion 66 of the load application section 62 is then inserted to the cylindrical section 63 of the carrier 61. The thickness of the circular plate section 64 is about 0.2 mm, for example. The thickness of the bar 51 is about 0.3 mm, for example. Therefore, the bottom end of the protrusion 66 does not reach the circular plate section 64. A load is thereby applied to the bar 51 by the load application section 62. In this state, the surface of the bar 51 opposite to the medium facing surface is lapped by rotating the carrier 61 on the rotating surface plate 68.

Figure 25:
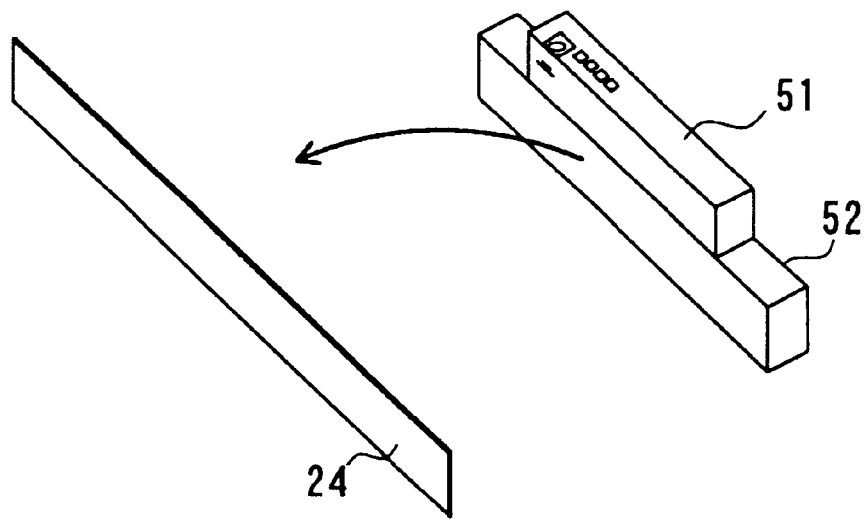
FIG. 25 is a perspective view for illustrating the step of peeling off the tape from the bar and the piece of the support plate.

The warpage in the surface of the bar 51 opposite to the medium facing surface having been eliminated through the lapping described above, the tape 24 is peeled off from the bar 51 and the piece 52 of the support plate 22 as shown in FIG. 25. If the tape 24 is an ultraviolet-setting tape, an ultraviolet ray is applied to the tape 24. If the tape is a thermopeeling tape, the tape 24 is heated. The adhesiveness of the tape 24 is thereby reduced and the tape 24 is then peeled off. If the tape 24E shown in FIG. 20 is used, the step of peeling off the tape 24 from the bar 51 and the piece 52 is not required.

Figure 26:
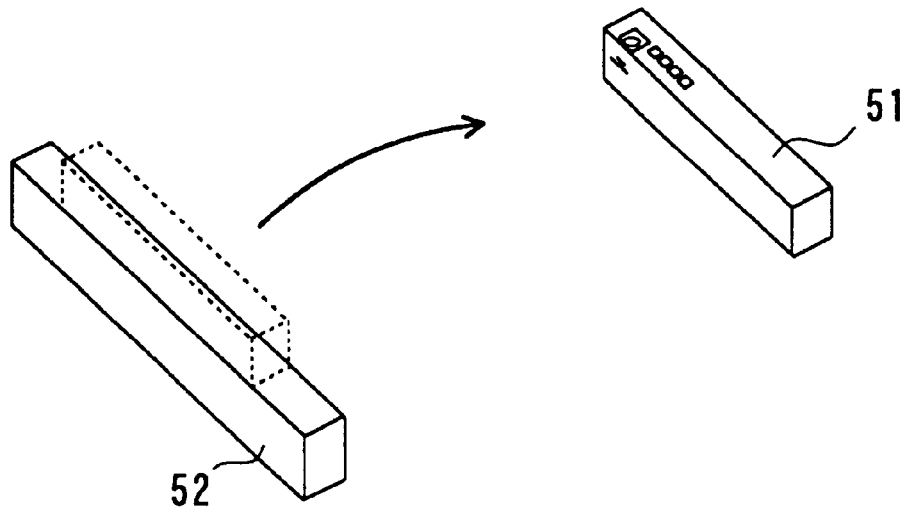
FIG. 26 is a perspective view for illustrating the step of separating the bar from the piece of the support plate.

Next, as shown in FIG. 26, the bar 51 is separated from the piece 52 to obtain the separated bar 51 through a method depending on the type of adhesive used for bonding the wafer block 21, the support plate 22 and the dummy block 23 to one another. The bar 51 is then briefly cleaned through ultrasonic cleaning in acetone or scrub cleaning, for example. Rails are then formed in the medium facing surface of the bar 51. Dry etching such as reactive ion etching or ion milling is used for making the rails.

Figure 27:
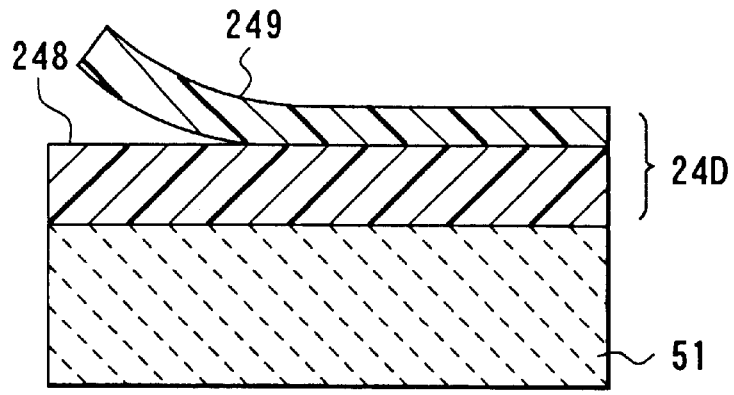
FIG. 27 is a cross section for illustrating the step of forming rails through the use of the tape in the embodiment of the invention.
Figure 28:
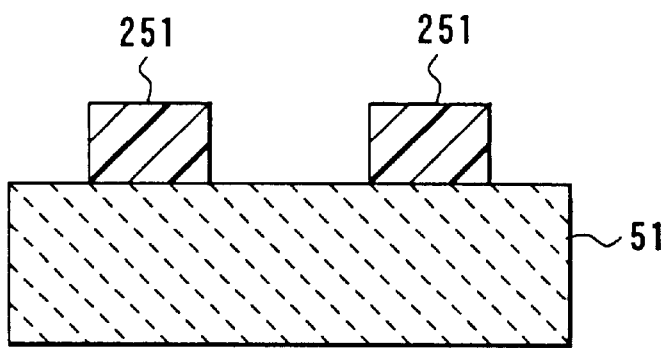
FIG. 28 is a cross section for illustrating the step of forming the rails through the use of the tape in the embodiment of the invention.
Figure 29:
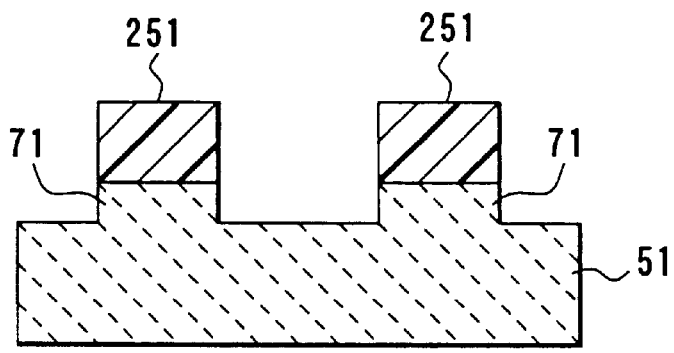
FIG. 29 is a cross section for illustrating the step of forming the rails through the use of the tape in the embodiment of the invention.

If the tape (dry film resist) 24D shown in FIG. 19 is used, the tape 24D may be utilized as a photoresist for making the rails. Therefore, the tape 24D may be left until the step of forming the rails. Reference is now made to FIG. 27 to FIG. 29 to briefly describe the step of forming the rails through the use of the tape 24D. In the step, as shown in FIG. 27, the cover film 249 is peeled off from the tape 24D bonded to the bar 51, and the resist layer 248 is only left on the medium facing surface of the bar 51. Next, as shown in FIG. 28, the resist layer 248 is exposed through an exposure mask to form a photoresist mask 251 whose pattern corresponds to the rails. Next, as shown in FIG. 29, rails 71 are formed through dry etching such as reactive ion etching or ion milling with the mask 251 as an etching mask. The mask 251 is then removed.

According to the embodiment described so far, the support plate 22 is bonded to the surface of the wafer block 21 including surfaces of all the slider sections. The specific processing is performed on the medium facing surfaces of a row of slider sections in the medium facing surface of the wafer block 21 bonded to the support plate 22. The wafer block 21 together with the support plate 22 is then cut so that the row of slider sections whose medium facing surfaces are thus processed are separated from the wafer block 21 to be the bar 61. Therefore, the bar 51 is not separately fastened to a jig for processing the medium facing surface. As a result, deformation of the bar 51 is prevented and sliders having excellent properties are fabricated with precision. To be specific, it is possible to reduce adverse effects on the processing accuracy of the surface of the bar 51 processed and to prevent deformations such as warpage of the layers (patterns) making up the thin-film magnetic head elements in the bar 51. In addition, the resistance value of each MR element, the MR height and the throat height are precisely controlled. Furthermore, the rail formation as the post-step is precisely performed.

Moreover, according to the embodiment, it is not necessary to repeat bonding the wafer block 21 to the support plate 22 and separating the wafer block 21 from the support plate 22 every time the wafer block 21 is cut. The production efficiency is therefore improved. Since the wafer block 21 is bonded to the support plate 22 and the bar 51 having gone through the cutting step is still bonded to the piece 52 of the support plate 22, the wafer block 21 and the bar 51 as intermediate products are easily handled during the manufacturing process of the sliders. That is, by making the support plate 22 greater than the wafer block 21 in width, the width of the wafer block 21 and the support plate 22 joined together or the bar 51 and the piece 52 of the support plate 22 joined together is maintained and they are handled as those having a fixed width even if the width of the wafer block 21 is changed.

According to the embodiment, the dummy block 23 for assisting in supporting the wafer block 21 is placed on the surface of the wafer block 21 opposite to the medium facing surface thereof. The wafer block 21 is joined to the dummy block 23 and the support plate 22 is joined to the dummy block 23. As a result, even when the number of rows of slider sections remaining in the wafer block 21 becomes fewer, the rigidity and precision of the wafer block 21 are kept similar to those when many rows of slider sections remain in the wafer block 21. As a result, sliders having excellent properties are more precisely fabricated even when the number of rows of slider sections remaining in the wafer block 21 becomes fewer.

According to the embodiment, the support plate 22 may be made of a material the same as the material of the main part of the wafer block 21. As a result, deformation of the wafer block 21 due to the difference in the materials of the support plate 22 and the wafer block 21 is avoided and sliders having excellent properties are more precisely fabricated.

According to the embodiment, the wafer block 21 is bonded to the support plate 22 and the bar 51 having hone through the cutting step is still bonded to the piece 52 of the support plate 22. As a result, the wafer block 21 and the bar 51 are handled without touching the wafer block 21 and the bar 51. Damage to the sliders caused by handling is thus reduced and the yield of the sliders is improved.

According to the embodiment, the tape 24 is placed to cover the medium facing surface 21a of the wafer block 21 for protecting the medium facing surface 21a when the wafer block 21 is cut. It is thereby possible to prevent erosion of the pole portions due to a water-soluble grinding agent, scratches mechanically resulting on the medium facing surface 21a, and dust depositing on the medium facing surface 21a, and so on when the wafer block 21 is cut. Furthermore, the tape 24 bonded to the medium facing surface 21a of the wafer block 21 prevents damage such as chipping of the bar 51 while handled after the bar 51 is sliced from the wafer.

In the embodiment it is not necessary to bond the medium facing surface 21a of the wafer block 21 to a dedicated jig before the wafer block 21 is cut or to detach the bar 51 from the jig after the wafer block 21 is cut every time the wafer block 21 is cut. As a result, time required for such bonding and detaching is eliminated and the production efficiency is improved.

When the tape 24 is bonded to the medium facing surface 21a of the wafer block 21 and peeled off, a less amount of adhesive transfer is left on the medium facing surface 21a and the cleaning property (the cleaning efficiency and the state after cleaning) is improved, compared to a case in which the medium facing surface 21a is bonded to a dedicated jig with a binder such as a thermosetting resin or a thermoplastic adhesive and then detached. If an ultraviolet-setting tape or a thermopeeling tape is used for the tape 24, in particular, an adhesive transfer on the medium facing surface 21a is almost completely eliminated.

Since the tape 24 is bonded to the medium facing surface 21a of the wafer block 21, the bar 51 is held through the tape 24 without any dedicated jig. Handling of the bar 51 is thereby facilitated and automation of processing of the separated bar 51 is easily achieved.

The present invention is not limited to the embodiment described so far. For example, the invention is not limited to a slider for a thin-film magnetic head but may be applied to a slider used for any other purpose such as a head (pickup) for writing or reading of data in the optical recording or magneto-optical recording system.

According to the method of manufacturing sliders of the invention described so far, the specific processing is performed on the medium facing surfaces of a row of the sections to be the sliders located at one end of the material, and the material is cut while the medium facing surfaces are covered with a strip-shaped protection member such that the row of the sections to be the sliders whose medium facing surfaces have received the specific processing are separated from the material to be the slider aggregate. As a result, the medium facing surfaces thus processed are protected when the material is cut and sliders having excellent properties are thereby fabricated with precision. Furthermore, it is not necessary to bond the medium facing surface of the material to a dedicated jig or to detach the slider aggregate from the jig every time the material is cut. The production efficiency and the cleaning property are thereby improved.

In the method of manufacturing sliders of the invention, the protection member may be a tape having adhesiveness and the cutting step may include the step of bonding the protection member to the medium facing surface of the material before the material is cut. In this case the slider aggregate separated from the material is bonded to the protection member. Therefore, damage to the slider aggregate while handled is prevented and handling of the slider aggregate is facilitated.

In the method of manufacturing sliders of the invention, the protection member may be peeled off from the slider aggregate after the adhesiveness of the protection member is reduced. In this case an adhesive transfer on the medium facing surface of the slider aggregate is almost eliminated and the cleaning property is further improved.

In the method of manufacturing sliders of the invention, the protection member may be a tape containing a conductive substance. In this case static damage to the sliders is prevented.

In the method of manufacturing sliders of the invention, the protection member may be a tape having no adhesiveness and the step of cutting may include the step of holding the medium facing surface of the material while the protection member is inserted before the material is cut. In this case it is not necessary to peel off the protection member from the slider aggregate.

In the method of manufacturing sliders of the invention, the protection member may include a resist layer made of a photoresist material. In addition, the method may include the step of forming an etching mask using the resist layer of the protection member on the medium facing surface of the slider aggregate having gone through the step of cutting, and etching the medium facing surface through the use of the mask. In this case the protection member is further used in the step of etching the medium facing surface and the production efficiency is thereby further improved.

In the apparatus for manufacturing sliders of the invention, the material having a row of the sections to be the sliders located at one end of the material, the medium facing surfaces of the row of the sections to be the sliders having received the specific processing, is held while the medium facing surfaces are covered with the strip-shaped protection member. The material thus held is cut while the medium facing surfaces are covered with the protection member such that the row of the sections to be the sliders whose medium facing surfaces have received the specific processing are separated from the material to be the slider aggregate. As a result, the medium facing surfaces thus processed are protected when the material is cut and sliders having excellent properties are thereby fabricated with precision. Furthermore, it is not necessary to bond the medium facing surface of the material to a dedicated jig or to detach the slider aggregate from the jig every time the material is cut. The production efficiency and the cleaning property are thereby improved.

Obviously many modifications and variations of the present invention are possible in the light of the above teachings. It is therefore to be understood that within the scope of the appended claims the invention may be practiced otherwise than as specifically described.

What is claimed is:

1. A method of manufacturing sliders to fabricate a slider aggregate that is made from a material including a plurality of rows of sections to be the sliders each having a medium facing surface, the slider aggregate including one of the rows of the sections to be the sliders whose medium facing surfaces receive a specific processing, the method including the steps of:

performing the specific processing on the medium facing surfaces of the row of the sections to be the sliders located at one end of the material and cutting the material while the medium facing surfaces are covered with a strip-shaped protection member such that the row of the sections to be the sliders whose medium facing surfaces have received the specific processing are separated from the material to be the slider aggregate.

2. The method according to claim 1, wherein the protection member is a tape having adhesiveness and the step of cutting includes the step of bonding the protection member to the medium facing surfaces located in the material before cutting the material.

3. The method according to claim 2, further including the step of peeling off the protection member from the slider aggregate having gone through the step of cutting.

4. The method according to claim 3, wherein the protection member is peeled off from the slider aggregate after the adhesiveness of the protection member is reduced.

5. The method according to claim 1, wherein the protection member is a tape containing a conductive substance.

6. The method according to claim 1, wherein the protection member is a tape having no adhesiveness and the step of cutting includes the step of holding the medium facing surfaces located in the material while the protection member is inserted before cutting the material.

7. The method according to claim 1, wherein the protection member includes a resist layer made of a photoresist material.

8. The method according to claim 7, further including the step of forming an etching mask using the resist layer of the protection member on the medium facing surface of the slider aggregate having gone through the step of cutting, and etching the medium facing surface through the use of the mask.

9. The method according to claim 1, wherein the step of performing the processing includes lapping of the medium facing surfaces.

10. The method according to claim 1, wherein the sections to be the sliders each include a thin-film magnetic head element.

* * * * *